US010847149B1

(12) United States Patent
Mok et al.

(10) Patent No.: US 10,847,149 B1
(45) Date of Patent: Nov. 24, 2020

(54) SPEECH-BASED ATTENTION SPAN FOR VOICE USER INTERFACE

(71) Applicant: Amazon Technologies, Inc., Seattle, WA (US)

(72) Inventors: Siu Ming Mok, Bellevue, WA (US); Joseph Dean Nason Pemberton, Seattle, WA (US); Robert David Owen, Sammamsih, WA (US); Diamond Bishop, Seattle, WA (US); Eliav Samuel Zimmern Kahan, Jamica Plain, MA (US)

(73) Assignee: Amazon Technologies, Inc., Seattle, WA (US)

( * ) Notice: Subject to any disclaimer, the term of this patent is extended or adjusted under 35 U.S.C. 154(b) by 131 days.

(21) Appl. No.: 15/694,292

(22) Filed: Sep. 1, 2017

(51) Int. Cl.
*G10L 15/00* (2013.01)
*G10L 15/22* (2006.01)
*G10L 15/08* (2006.01)
*G10L 25/78* (2013.01)
*G10L 15/26* (2006.01)

(52) U.S. Cl.
CPC .............. *G10L 15/22* (2013.01); *G10L 15/08* (2013.01); *G10L 25/78* (2013.01); *G10L 2015/088* (2013.01); *G10L 2015/223* (2013.01)

(58) Field of Classification Search
CPC ......... G10L 15/22; G10L 15/08; G10L 25/78; G10L 2015/088; G10L 2015/223
USPC ....... 704/231, 232, 235, 246, 251, 257, 270, 704/275
See application file for complete search history.

(56) References Cited

U.S. PATENT DOCUMENTS

| 7,447,636 B1 * | 11/2008 | Schwartz | ................ G10L 15/19 379/88.01 |
| 9,431,021 B1 * | 8/2016 | Scalise | .................... G10L 21/00 |
| 9,542,941 B1 * | 1/2017 | Weksler | .................. G10L 15/22 |
| 2017/0169817 A1 * | 6/2017 | VanBlon | ................. G10L 15/02 |

* cited by examiner

*Primary Examiner* — Thierry L Pham
(74) *Attorney, Agent, or Firm* — Pierce Atwood LLP

(57) ABSTRACT

Techniques for enabling a device to send to a speech processing server further input audio data following a completed utterance dialog to prevent the need for subsequent keywords to be spoken to invoke subsequent commands are described. A system receives input audio data corresponding to an utterance from a device upon the device detecting speech corresponding to a keyword. The system performs speech processing on the input audio data to determine a command. The system determines output data responsive to the command and sends same to the device, thus completing operations regarding the utterance. The system may also send an instruction to the device to: send to the system further input audio data corresponding to further input audio without the device first detecting a wake command.

20 Claims, 20 Drawing Sheets

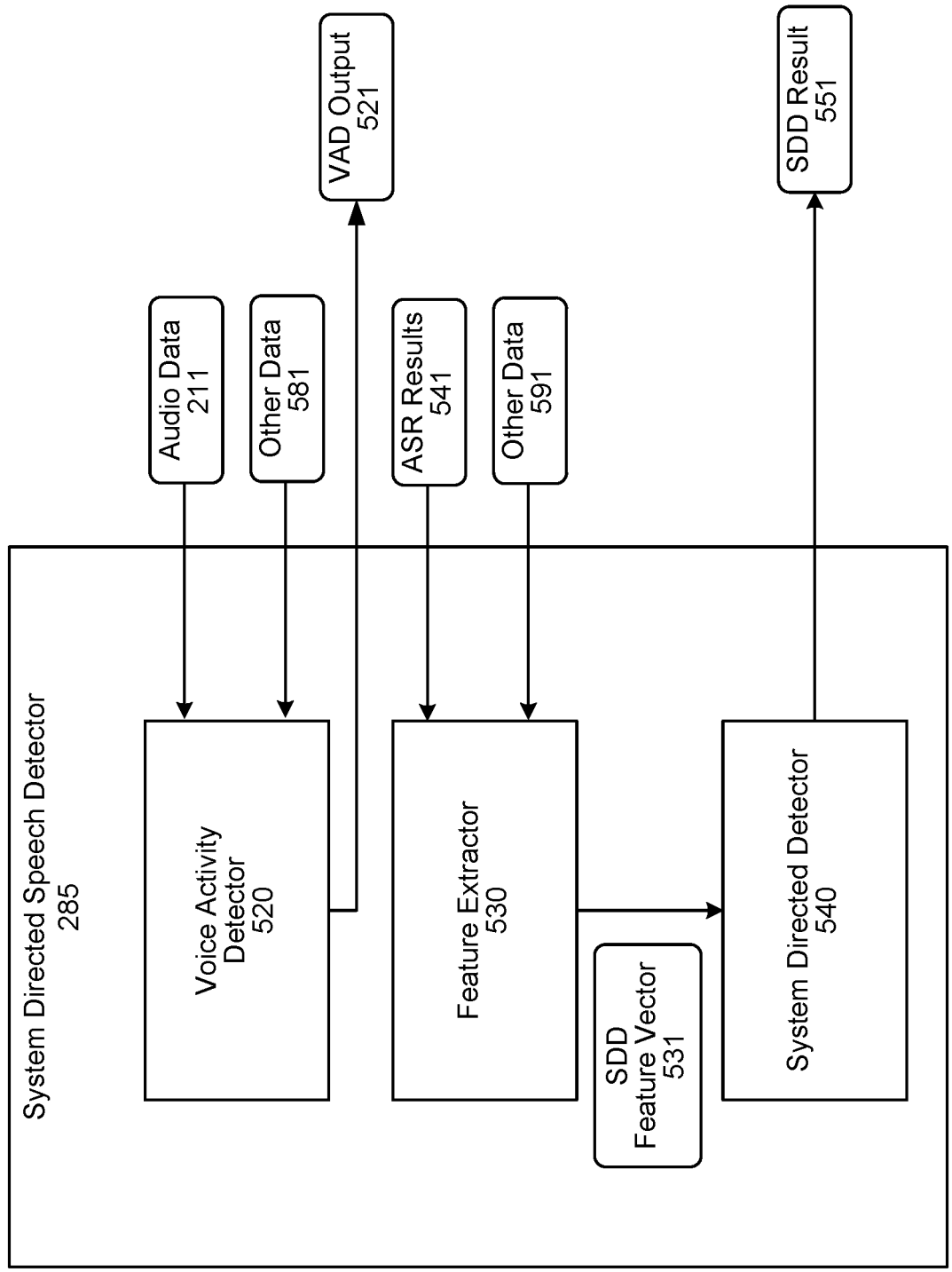

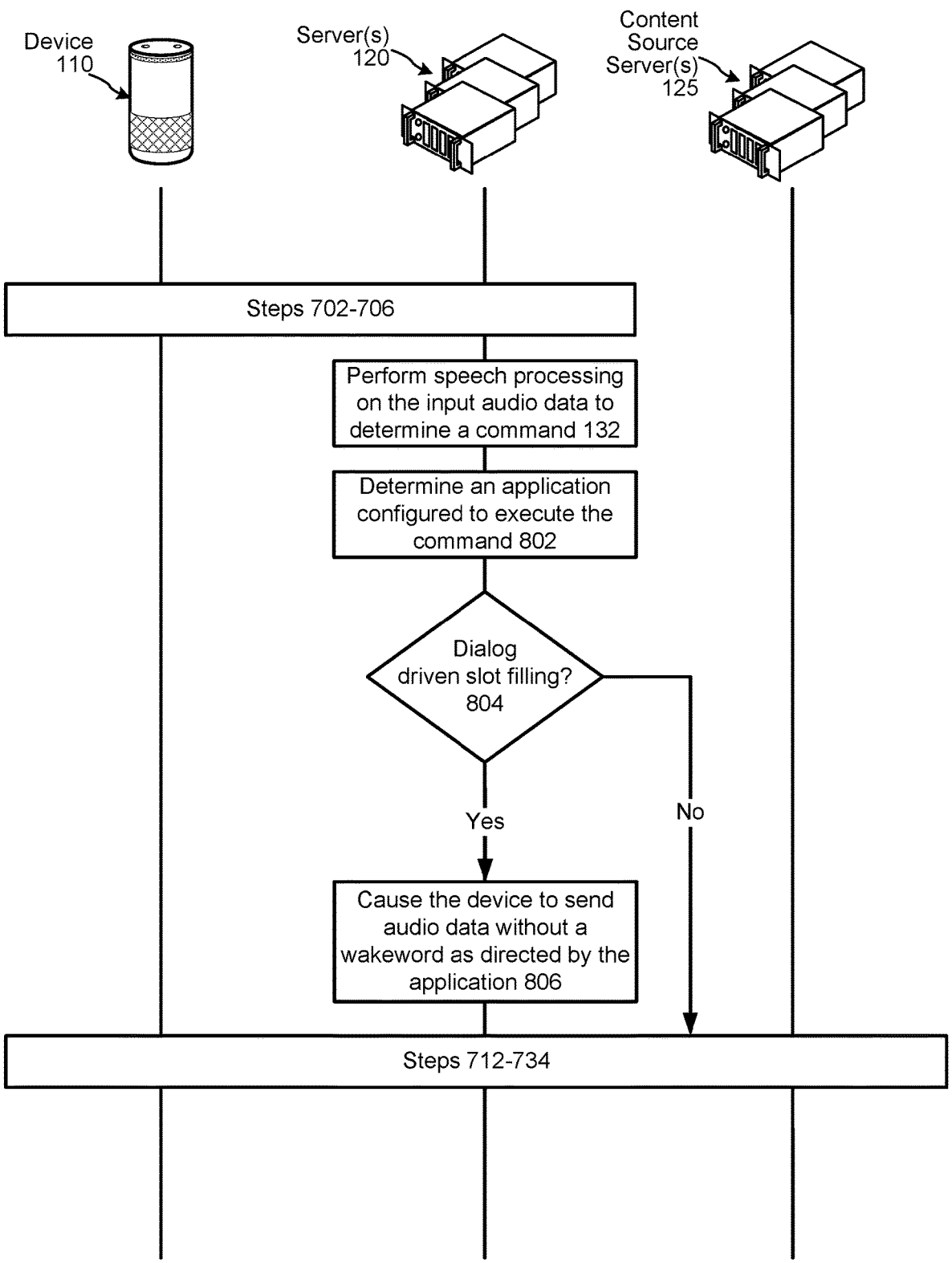

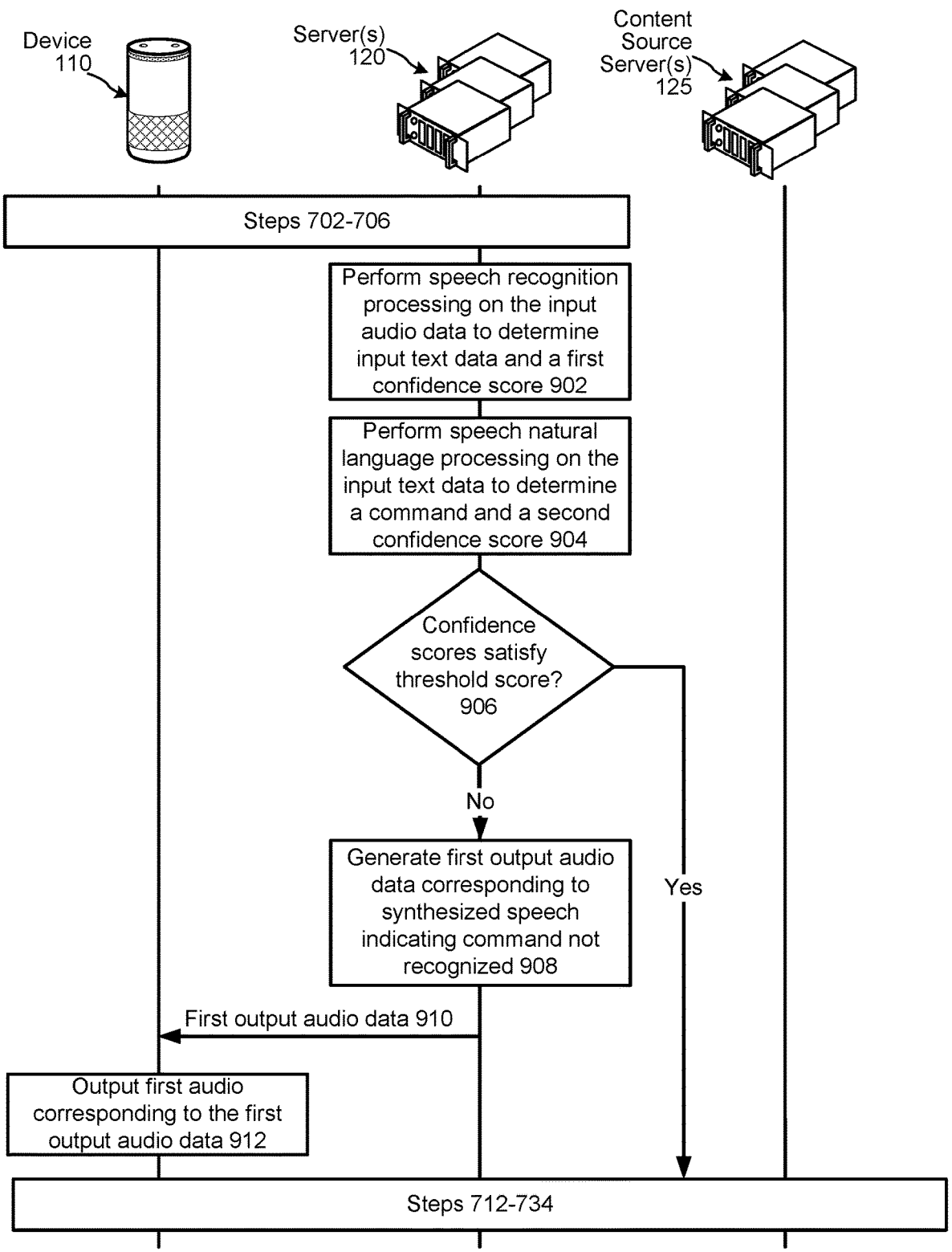

SPEECH-BASED ATTENTION SPAN FOR VOICE USER INTERFACE

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 5A is a conceptual diagram of components of a system to detect if input audio data includes system directed speech according to embodiments of the present disclosure.

FIG. 8 is a signal flow diagram illustrating the processing performed when a command resulting in dialog driven slot filling is input to a system according to embodiments of the present disclosure.

FIG. 9 is a signal flow diagram illustrating the processing performed when an unrecognized command is input to a system according to embodiments of the present disclosure.

DETAILED DESCRIPTION

Figure 1:
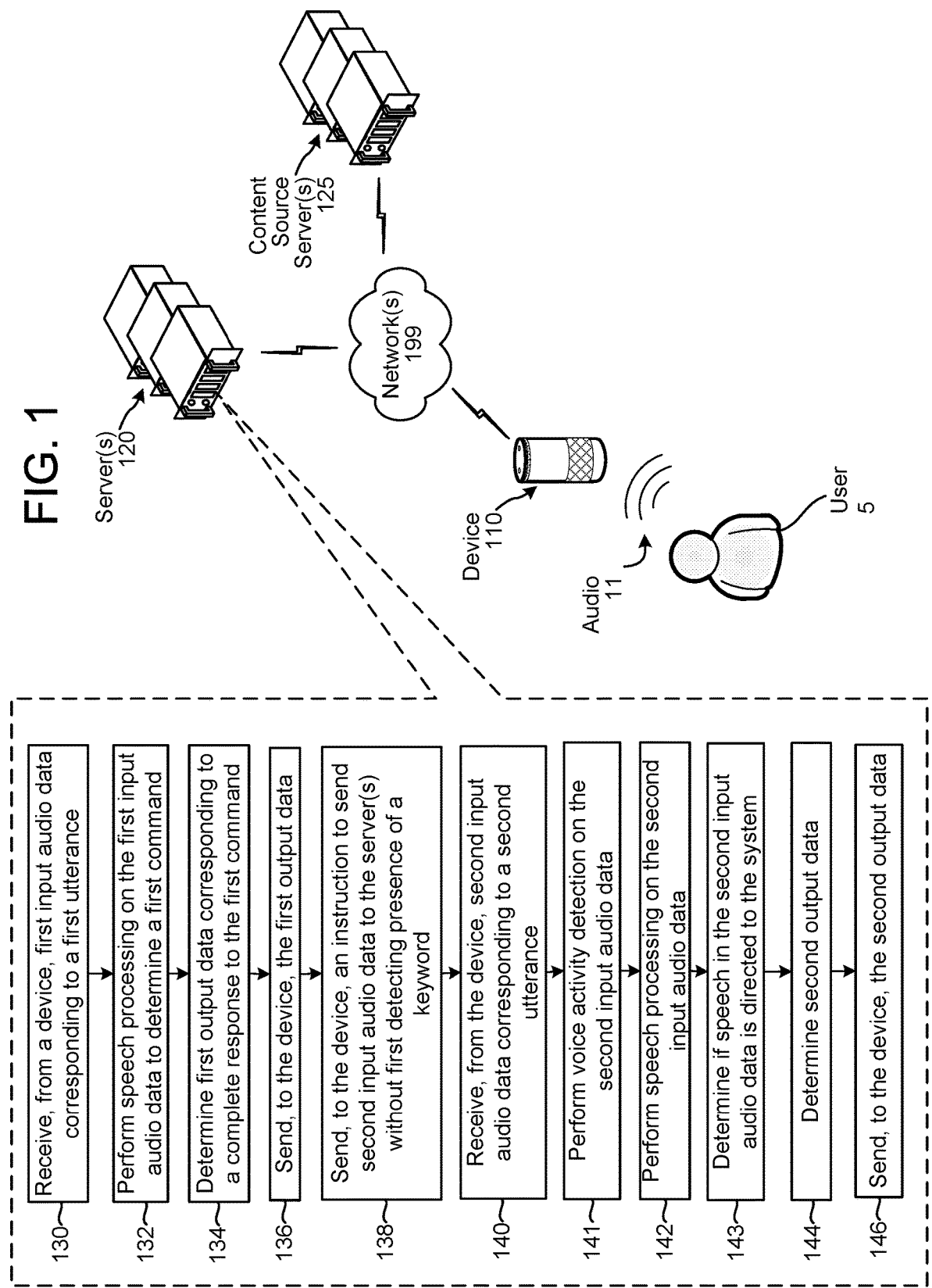
FIG. 1 illustrates a system configured to cause devices to send audio data to a server(s) when a user is not required to provide additional information to enable the system to determine a response to an initial command according to embodiments of the present disclosure.

Automatic speech recognition (ASR) is a field of computer science, artificial intelligence, and linguistics concerned with transforming audio data associated with speech into text data representative of that speech. Natural language understanding (NLU) is a field of computer science, artificial intelligence, and linguistics concerned with enabling computers to derive meaning from text input containing natural language. Text-to-speech (TTS) is a field of computer science, artificial intelligence, and linguistics concerned with enabling computers to output synthesized speech. ASR, NLU, and TTS may be used together as part of a speech processing system.

A speech processing computing system may be configured to answer user commands requesting the output of content. For example, a user may say "what is the weather in Seattle." The system may determine content responsive to the command (e.g., weather information for Seattle) and output the content to the user. The input of speech corresponding to a command, the processing of the command to determine output content, and the output of the content may be considered a "turn."

Such a system may be configured to commence a turn when a user device detects speech corresponding to a keyword (e.g., a wakeword such as "Alexa"). A user device may remain in a sleep mode until the device detects speech corresponding to the keyword. While in sleep mode, the device may continuously buffer and process captured audio to detect speech corresponding to the keyword. Once the device detects the keyword, the device may wake and begin sending audio data for the captured audio (and/or buffered audio) to one or more servers for processing. Once the server(s) has enough audio data to process (for example, a speech-endpoint has been reached in the audio data), the device may cease sending audio data to the server(s). The device may continually process captured audio to detect the keyword, even while the device is outputting content responsive to input speech.

A user may speak a keyword followed by an initial command. When the device detects the keyword, the device sends audio data corresponding to the initial command to the server(s). The server(s) may determine more information is needed from the user in order for the system to determine a response to the initial command. (For example, the user may request the system add an item to a list, but may not say what the item is.) In such instances, the server(s) 120 may cause the device to output synthesized speech (or another form of prompt) soliciting the additional information from the user. In such a situation the server(s) 120 may also instruct the device to send further audio data to the server(s) 120 (which may represent speech including the prompted-for information) without first determining if a keyword was spoken. Thus, if the user speaks the additional information in response to the prompt without first speaking the keyword, the additional speech may be captured by the device. The device may then send audio data corresponding to the additional information to the server(s) without first detecting a spoken keyword. Such situations may be referred to as dialog driven slot filling in which the user needs to provide additional information in order for the system to output a response to the user corresponding to the ongoing conversation (e.g., the dialog) between the system and the user. Such operations may be performed when the system determines that additional information is needed from the user in order to complete an operation of a pending command (e.g., processing related to a particular dialog is ongoing).

In certain situations, however, it may be desirable to have a local device continue to capture audio and send audio data to the serve, even if no information is needed by the system to complete operation of a pending command/dialog. Thus, even if the server has sufficient information to complete processing of an utterance (or group of utterances as part of a dialog) and even if processing of the utterance/dialog is complete, the system may still instruct a local device to send audio data corresponding to captured audio when no wakeword is detected. Such continued provision of audio data by the local device may be initiated in circumstances where operations related to a previous utterance/dialog have concluded, but the system still determines that the user may say something that the system may wish to capture.

Thus, the present disclosure improves a speech processing system by causing one or more user devices to send audio data to a server(s) without first detecting a spoken keyword in a non-dialog driven slot filling context (e.g., even when processing of a previous dialog is complete.). A user may speak a keyword followed by a first command. When the device detects the keyword, the device sends audio data corresponding to the initial command to the server(s). The server(s) determines content responsive to the command. The server(s) also determines it is likely that the user will provide the system with a second command (e.g., a new command indicating the beginning of a new dialog from the first command) following output of the content responsive to the first command. The second command does not correspond to information needed by the system to determine the content responsive to the first command. The server(s) causes the device to (i) output the content responsive to the first command as well as (ii) send audio data, corresponding to audio captured after and optionally during output of the content, to the server(s) without the device first detecting a spoken keyword.

The teachings of the present disclosure are different from the dialog driven slot filling situation described above. In the dialog driven slot filling context, the system instructs the local device to send audio data to the server(s) without first detecting a spoken keyword when the system needs additional information from the user in order for the system to provide a response to an initial command (e.g., additional information needed as part of the dialog). In contrast, according to the present disclosure, the system instructs the local device to send audio data to the server(s) without first detecting a spoken keyword when it is likely that the user will provide a second command that has no bearing on the system determining a response to the first, initial command (e.g., in a circumstance when the system has received all the audio data it needs to process the first command and any dialog related thereto). The teachings of the present disclosure reduce system/user friction, thereby providing a better user experience.

FIG. 1 illustrates a system for causing devices to send audio data to a server(s) when a user is not required to provide additional information to enable the system to determine a response to an initial command. Although the figures and discussion illustrate certain operational steps of the system in a particular order, the steps described may be performed in a different order (as well as certain steps removed or added) without departing from the intent of the disclosure. As illustrated in FIG. 1, a device 110 local to a user 5, one or more servers 120, and one or more content source servers 125 may be connected across one or more networks 199.

The device 110 continuously receives input audio via one or more microphones of the device 110. The device 110 may store the input audio, as input audio data, in a buffer to enable the device 110 to determine whether the input audio data includes speech corresponding to a keyword of the system. The device 110 may delete input audio data from the buffer when the device 110 determines the input audio data does not include speech corresponding to the keyword. Thus, the buffer may be a rolling buffer (e.g., input audio data is input into the buffer as input audio data is deleted from the buffer). Once the device 110 determines input audio data in the buffer includes speech corresponding to the keyword, the device 110 may send first input audio data, received subsequent to the input audio data including the speech corresponding to the keyword, to the server(s) 120.

The server(s) 120 receives (130) the first input audio data from the device 110. The server(s) 120 performs (132) speech processing on the first input audio data to determine a first command. For example, the server(s) 120 may perform speech recognition processing on the first input audio data to generate input text data. The server(s) 120 may then perform natural language processing on the input text data to determine the first command. The first command may correspond to a request for information (e.g., "what is the weather"), a request for the output of content (e.g., "play Adele"), a request to perform an action (e.g., "book me a flight to Seattle"), etc.

The server(s) 120 determines (134) first output data corresponding to a complete response to the first command. For example, if the first command corresponds to a request for the weather, the first output data may correspond to synthesized speech corresponding to weather information for the geographic location of the device 110. For further example, if the first command corresponds to a request for Adele to be played, the first output data may correspond to audio data corresponding to one or more songs sung by Adele. The server(s) 120 may receive output data (such as the first output data) from a first party (1P) storage (e.g., one maintained and/or operated by the server(s) 120). Alternatively, output data may be received from a third party (3P) source (e.g., one not maintained or operated by the server(s) 120, but in communication with the server(s) 120, such as the content source server(s) 125). The first output data may include audio data to be output via a speaker of the device 110 and/or text data to be displayed on a display of the device 110.

The server(s) 120 sends (136) the first output data to the device 110 for output to the user 5. The server(s) 120 also sends (138) an instruction to the device 110, with the instruction causing the device 110 to send second input audio data corresponding to captured audio to the server(s) 120 without first detecting the presence of a keyword in the input audio data. The instruction may also cause the device 110 to deactivate a voice/wakeword detection component of the device.

The device 110 outputs first content corresponding to the output data to the user 5. The device's microphone(s) may remain continuously open at all times. Thus, under normal circumstances and since the first content corresponds to a complete response to the first command, the device 110 would normally capture second input audio during and after output of the first content while only sending second input audio data to the server(s) 120 if the device 110 detects a keyword in the second audio data. However, in response to the device 110 receiving the instruction from the server(s) 120, the device 110 sends the second input audio data corresponding to second input audio captured after, and optionally during, output of the first content to the server(s) 120 without first detecting presence of a wake command (e.g., a keyword in the second input audio data).

The server(s) 120 receives (140) the second input audio data from the device 110. The server(s) 120 performs (141) voice activity detection (VAD) on the second input audio data to determine if the second input audio data includes speech. The server(s) 120 performs VAD on the second input audio data since the server(s) 120 caused the device 110 to send the second input audio data without first determining if speech was represented therein. If the server(s) 120 determines speech is represented in the second input audio data, the server(s) 120 performs (142) speech processing on the second input audio data. The server(s) 120 then determines (143) whether speech represented in the second input audio data is directed to the system, as compared to being background noise, user-to-user speech, or other audio that is not directed to the system. The server(s) 120 determines whether the speech is directed to the system since the server(s) 120 caused the device 110 to send the second input audio data without first determining if speech was represented therein. The server(s) 120 could determine whether the first input audio data includes speech directed to the system prior to performing speech processing on the first input audio data, however such may not be necessary since the device 110 may implement a VAD component as described herein below. If the speech is directed to the system, the server(s) 120 determines (144) second output data responsive to a second command represented in the second input audio data. The server(s) 120 then sends (146) the second output data to the device 110 for output to the user 5.

The process described with respect to FIG. 1 may be performed more than once in a row. For example, the server(s) 120 may send the instruction to the device 110 a second time (e.g., along with the second output data), thereby causing the device 110 to send the server(s) 120 third input audio data without first detecting presence of a keyword, and so on. The system may be configured to cause one or more devices to only send input audio data to the server(s) 120 without first detecting presence of a keyword a maximum number of times. For example, the system may cause the device 110 to send second input audio data to the server(s) 120 without first detecting presence of a keyword (with the second input audio data be sent during and/or after first content completely responsive to a first command is output by the device 110) and send third input audio data to the server(s) 120 without first detecting presence of a keyword (with the third input audio data be sent during and/or after second content completely responsive to a second command is output by the device 110), but will not cause the device 110 to send fourth input audio data to the server(s) 120 without first detecting presence of a keyword (with the fourth input audio data corresponding to fourth audio captured during and/or after third content completely responsive to a third command is output by the device 110).

As described and illustrated, output data may be sent to the same device that originated the input audio data. However, one skilled in the art should appreciate that output data may be sent to a different device than the device that originated the input data. More than one device may be associated with a single profile of the system. A user may speak a command to a first device but then look at a second device associated with the same profile. For example, the second device may include a camera that captures images. The server(s) 120 may process image data corresponding to the images to determine whether a user is looking at the second device. If the user looks at the second device, during or after the input command is received by the first device but prior to the server(s) 120 sending output data to a device, the server(s) 120 may send the output data to the second device for output to the user.

If the server(s) 120 does not determine voice activity in the second input audio data within a threshold amount of time, the server(s) 120 may send an instruction to the device 110 to cease sending the second input audio data to the server(s) 120 as well as re-enter sleep mode, resulting in the device 110 thereafter requiring third input audio data including a keyword prior to the device 110 sending the third input audio data to the server(s) 120. The threshold amount of time is configurable. The threshold amount of time may be a system default length of time or based on, for example, a system determination with respect to the previously input command, a user preference associated with the previously input command, etc. If the system determines to maintain the device connection but there is no user preference indicating how long device should connected prior to the device re-entering sleep mode, the system may cause the device to remain connected for a default, non-previously input command specific time.

The system may cause the device 110 to send second input audio data to the server(s) 120 without first detecting presence of keyword without considering user identity. For example, the device 110 may send first input audio data corresponding to a first spoken command, and optionally a keyword, of a first user to the server(s) 120. The server(s) 120 may thereafter cause the device 110 to send second input audio data to the server(s) 120 without first detecting presence of a keyword. Thereafter, the device 110 may send second input audio data corresponding to a second spoken command of a second user to the server(s) 120. The server(s) 120 may process the second input audio data even through a first user spoke the first command and a second user spoke the second command.

Figure 2:
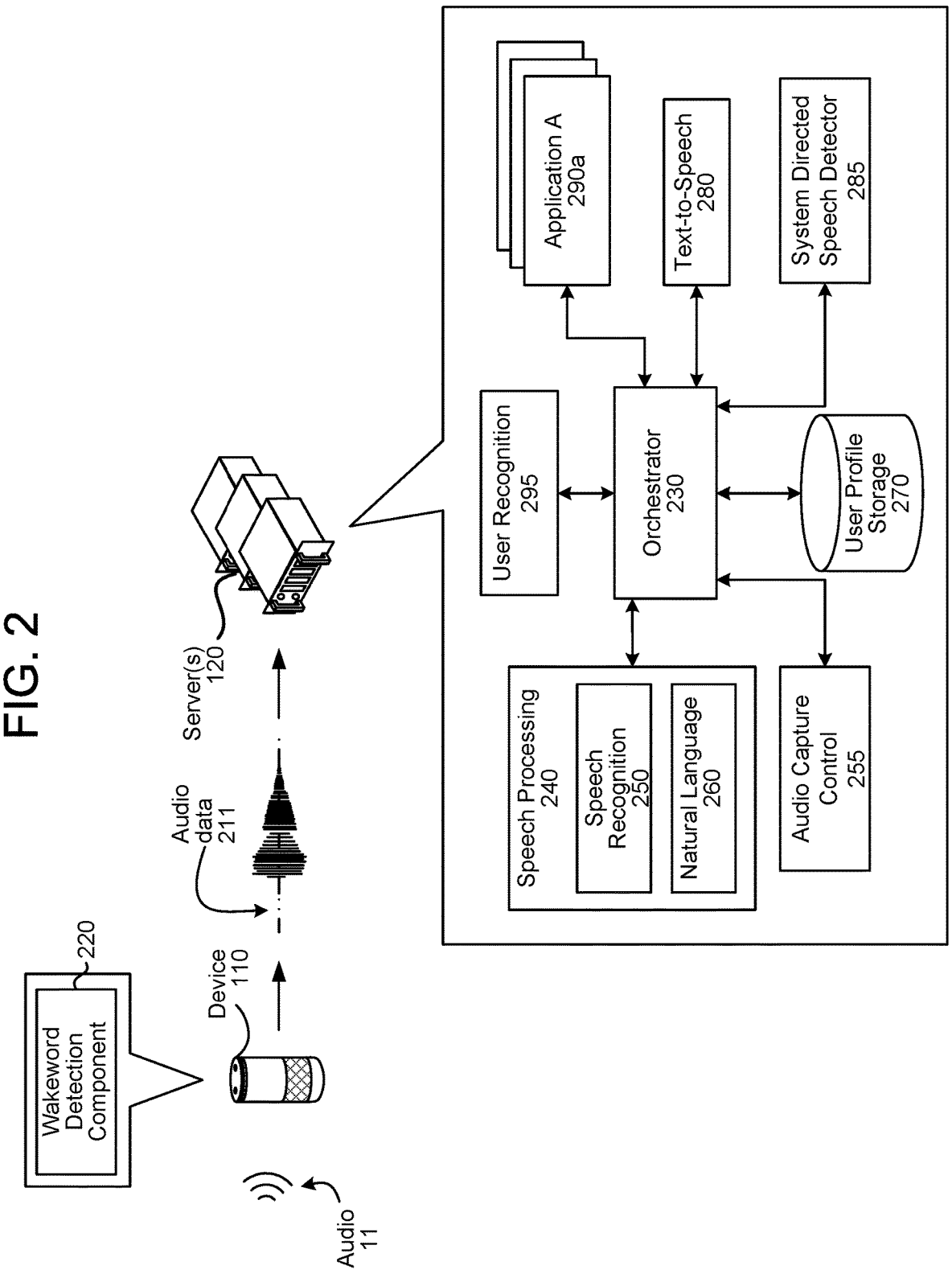
FIG. 2 is a conceptual diagram of components of a system according to embodiments of the present disclosure.

The system may operate using various components as described in FIG. 2. The various components illustrated FIG. 2 may be located on a same or different physical devices. Communication between various components illustrated in FIG. 2 may occur directly or across a network(s) 199.

The device 110 captures audio corresponding to speech 11, using an audio capture component, such as a microphone or array of microphones. The device 110, using a wakeword detection component 220, processes audio data corresponding to the input audio 11 to determine if a keyword (e.g., a wakeword) is detected in the audio data. Following detection of a wakeword, the device 110 sends audio data 211, corresponding to the speech, to the server(s) 120.

The wakeword detection component 220 works in conjunction with other components of the device, for example microphone(s) to detect keywords in audio 11. For example, the device 110 may convert audio 11 into audio data 211, and process the audio data 211 with the wakeword detection component 220 to determine whether speech is detected, and if so, if the audio data 211 comprising speech matches an audio signature and/or model corresponding to a particular keyword.

The device 110 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the device 110 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio 11 received by the device 110 (or separately from speech detection), the device 110 may use the wakeword detection component 220 to perform wakeword detection to determine whether a wakeword is detected in the speech, thus indicating that a user intends to speak a command to the device 110. This process may also be referred to as keyword detection, with the wakeword being a specific example of a keyword. Specifically, keyword detection is typically performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection component 220 may compare audio data 211 to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 110 may "wake" and begin transmitting audio data 111 corresponding to input audio 11 to the server(s) 120 for speech processing. While the local device 110 is transmitting audio data to the server(s), the local device 110 may also turn on an indicator (such as an LED light or other visual indicator, special beep or other audio indicator, or otherwise) that indicates to the user that the microphone(s) is "on" and that captured audio is being sent to the server(s) 120.

Upon receipt by the server(s) 120, the audio data 211 may be sent to an orchestrator component 230. The orchestrator component 230 may include memory and logic that enables the orchestrator component 230 to transmit various pieces and forms of data to various components of the system.

The orchestrator component 230 sends the audio data 211 to a speech processing component 240. A speech recognition component 250 of the speech processing component 240 transcribes the audio data 211 into one or more textual interpretations representing speech contained in the audio data 211. The speech recognition component 250 interprets the spoken utterance based on a similarity between the spoken utterance and pre-established language models. For example, the speech recognition component 250 may compare the audio data 211 with models for sounds (e.g., subword units or phonemes) and sequences of sounds to identify words that match the sequence of sounds spoken in the utterance represented in the audio data 211. The speech recognition component 250 sends text data generated thereby to a natural language component 260 of the speech processing component 260. The text data sent from the speech recognition component 250 to the natural language component 260 may include a top scoring textual interpretation of the audio data 211 or may include an N-best list including a group of textual interpretations of the audio data 211 and potentially their respective scores.

The natural language component 260 attempts to make a semantic interpretation of the phrases or statements represented in the text data input therein. That is, the natural language component 260 determines one or more meanings associated with the phrases or statements represented in the text data based on individual words represented in the text data. The natural language component 260 interprets a text string to derive an intent of the user command represented in the text data (e.g., an action that the user desires be performed) as well as pertinent pieces of information in the text data that allow a device (e.g., the device 110, the server(s) 120, etc.) to complete the intent. For example, if the text data corresponds to "call mom," the natural language component 260 may determine the user intended to activate a telephone in his/her device and to initiate a call with a contact matching the entity "mom."

The server(s) 120 may include a user recognition component 295. The user recognition component 295 may take as input the audio data 211 and/or the text data output by the speech recognition component 250. The user recognition component 295 determines scores indicating whether the command originated from particular users. For example, a first score may indicate a likelihood that the command originated from a first user, a second score may indicate a likelihood that the command originated from a second user, etc. The user recognition component 295 also determines an overall confidence regarding the accuracy of user recognition operations. The user recognition component 295 may perform user recognition by comparing speech characteristics in the audio data 211 to stored speech characteristics of users. The user recognition component 295 may also perform user recognition by comparing biometric data (e.g., fingerprint data, iris data, etc.) received by the system in correlation with the present command to stored biometric data of users. The user recognition component 295 may further perform user recognition by comparing image data (e.g., including a representation of at least a feature of a user) received by the system in correlation with the present command with stored image data (e.g., including representations of features of users). The user recognition component 295 may perform additional user recognition processes, including those known in the art. Output of the user recognition component 295 may be used to inform natural language component 260 processes as well as processing performed by applications 290.

The server(s) 120 may include a user profile storage 270. The user profile storage 270 may include a variety of information related to individual users, groups of users, etc. that interact with the system. The user profile storage 270 may include one or more customer profiles. Each customer profile may be associated with a different customer identifier (ID). A customer profile may be an umbrella profile specific to a group of users. That is, a customer profile encompasses two or more individual user profiles, each associated with a unique respective user ID. For example, a customer profile may be a household profile that encompasses user profiles associated with multiple users of a single household. A customer profile may include preferences shared by all the user profiles encompassed thereby. Each user profile encompassed under a single customer profile may include preferences specific to the user associated therewith. That is, each user profile may include preferences unique with respect to one or more other user profiles encompassed by the same customer profile. A user profile may be a stand-alone profile or may be encompassed under a customer profile. As illustrated, the user profile storage 270 is implemented as part of the server(s) 120. However, it should be appreciated that the user profile storage 270 may be located proximate to the server(s) 120, or may otherwise be in communication with the server(s) 120, for example over the network(s) 199.

The orchestrator component 230 may send output from the natural language component 260 (e.g., text data including tags attributing meaning to the words and phrases represented in the text data), and optionally output from the user recognition component 295 and/or data from the user profile storage 270, to one or more applications 290. FIG. 2 illustrates various applications 290 executed by the server(s) 120. However, it should be appreciated that the orchestrator component 230 may additionally or alternatively send output from the natural language component 260 to one or more content source servers 125 executing applications that may thereby cause the content source servers 125 to provide the server(s) 120 with content responsive to the command.

An "application," as used herein, may be considered synonymous with a skill. A "skill" may be software running on the server(s) 120 that is akin to an application. That is, a skill may enable the server(s) 120 or other remote device to execute specific functionality in order to provide data or produce some other output requested by a user. The system may be configured with more than one skill. A skill may either be executed by the server(s) 120 or merely associated with the server(s) 120 (i.e., one executed by a different remote device). For example, a weather service skill may enable the server(s) 120 to execute a command with respect to a weather service server(s), a car service skill may enable the server(s) 120 to execute a command with respect to a taxi or ride sharing service server(s), an order pizza skill may enable the server(s) 120 to execute a command with respect to a restaurant server(s), etc.

The orchestrator component 230 may choose which application 290 to send data to based on the output of the natural language component 260. In an example, the orchestrator component 230 may send data to a music playing application when the natural language component 260 outputs text data associated with a command to play music. In another example, the orchestrator component 230 may send data to a weather application when the natural language component 260 outputs text data associated with a command to output weather information. In yet another example, the orchestrator component 230 may send data to a search engine application when the natural language component 260 outputs text data associated with a command to obtain search results.

An application 290 may output text data, which the orchestrator component 230 may send to a text-to-speech component 280. The text-to-speech component 280 may synthesize speech corresponding to the text data input therein. The server(s) 120 may send audio data synthesized by the text-to-speech component 280 to the device 110 (or another device including a speaker and associated with the same user ID or customer ID) for output to the user.

The text-to-speech component 280 may perform speech synthesis using one or more different methods. In one method of synthesis called unit selection, the text-to-speech component 280 matches text data against a database of recorded speech. Matching units are selected and concatenated together to form audio data. In another method of synthesis called parametric synthesis, the text-to-speech component 280 varies parameters such as frequency, volume, and noise to create an artificial speech waveform output. Parametric synthesis uses a computerized voice generator, sometimes called a vocoder.

The server(s) 120 may additionally include an audio capture control component 255. The audio capture control component 255 may determine whether a device 110 should be enabled to send non-wakeword triggered audio data to the server(s) 120 following receipt of an initial utterance, even if no further user input data to complete processing of the initial utterance is needed. That is, the system may determine that the data determined thusfar (e.g., the audio data from the utterance, the post NLU results based on the audio data, or the like) is sufficient to complete processing of a command related to the utterance without obtaining further input from the user and, even so, may instruct a device 110 to send audio data to the server(s) 120 without first detecting a wake command. For example, the audio capture control component 255 may determine that a first command is of a command type that is likely to be followed by a new command within a time threshold, and thus a local device that captured an utterance of the first command should send to the server(s) 120 non-wakeword triggered audio data following output of data for the first command. The capture control component 255 may also perform a variety of operations/techniques to determine when to instruct a local device to send to the server(s) 120 non-wakeword triggered audio data as described herein with respect to, for example, FIGS. 7A through 13.

Figure 3:
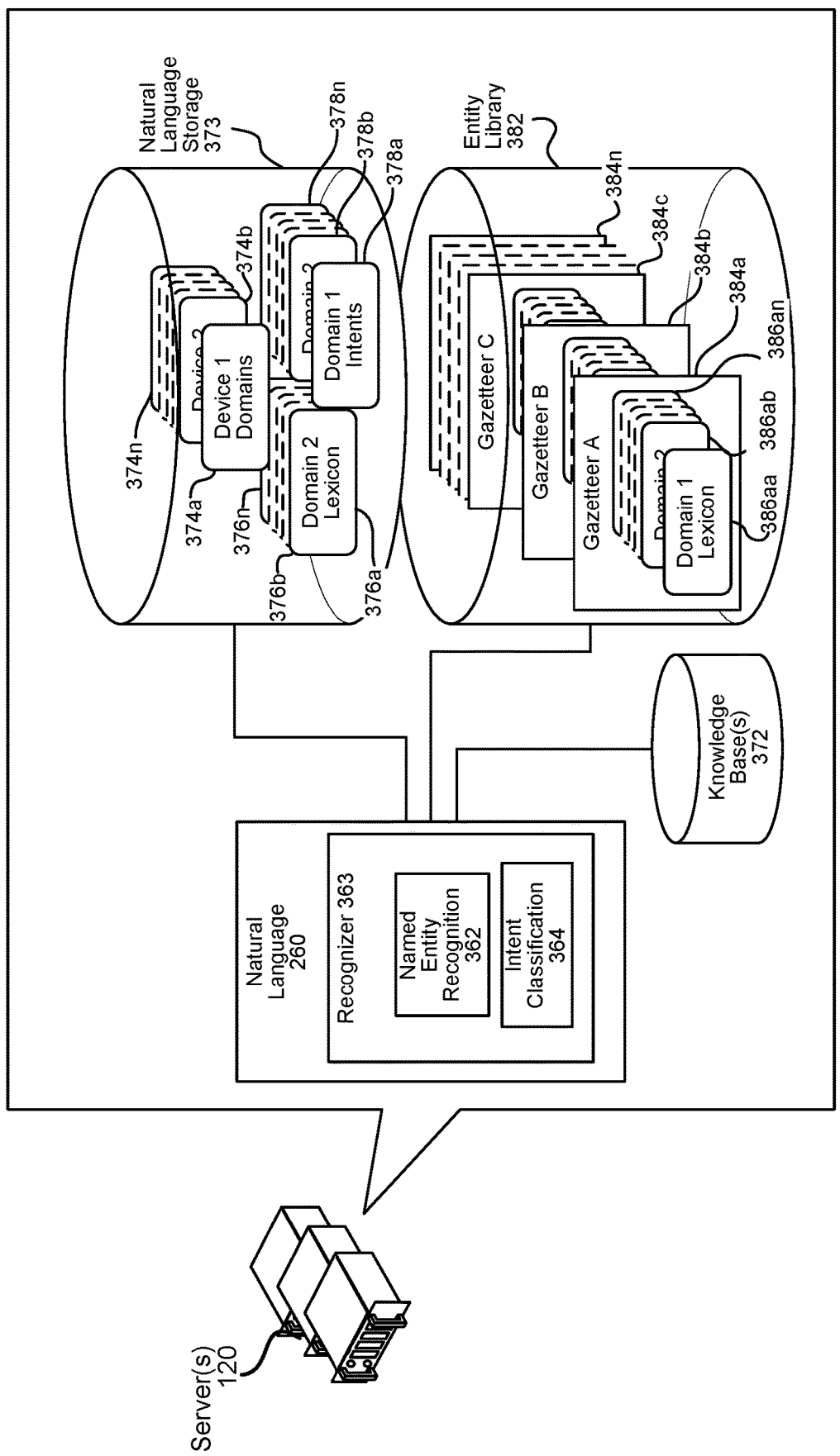
FIG. 3 is a conceptual diagram of how natural language processing is performed according to embodiments of the present disclosure.

FIG. 3 illustrates how natural language processing is performed on audio data. Generally, the natural language component 260 attempts to make a semantic interpretation of text represented in text data (e.g., ASR results 541 output by the speech recognition component 250). That is, the natural language component 260 determines the meaning behind the text represented in text data based on the individual words. The natural language component 260 interprets text to derive an intent or a desired action from the user as well as the pertinent pieces of information in the text that allow a device (e.g., device 110) to complete that action.

The natural language component 260 may process text data including several textual interpretations of a single utterance. For example, if the speech recognition component 250 outputs text data including an N-best list of textual interpretations, the natural language component 260 may process the text data with respect to all (or a portion of) the textual interpretations represented therein.

The natural language component 260 may include one or more recognizers 363. Each recognizer 363 may be associated with a different "domain." A domain may correspond to a common group of information or activities, such as weather, music, video, communications, shopping, etc. The natural language component 260 may determine a domain potentially associated with a textual interpretation represented in text data input thereto in order to determine the proper recognizer 363 to process the textual interpretation. The natural language component 260 may determine a single textual interpretation is potentially associated with more than one domain. Multiple recognizers 263 may be functionally linked (e.g., a telephony/communications recognizer and a calendaring recognizer may utilize data from the same contact list).

If the natural language component 260 determines a specific textual interpretation is potentially associated with multiple domains, the recognizers 363 associated with the domains may process the specific textual interpretation in parallel. For example, if a specific textual interpretation potentially implicates both a communications domain and a music domain, a recognizer associated with the communications domain may process the textual interpretation in parallel, or substantially in parallel, with a recognizer associated with the music domain processing the textual interpretation. The output generated by each recognizer 363 may be scored, with the overall highest scored output from all recognizers ordinarily being selected to be the correct result.

The natural language component 260 may communicate with various storages to determine the potential domain(s) associated with a textual interpretation. The natural language component 260 may communicate with the natural language storage 373, which includes a databases of devices (374a-374n) identifying domains associated with specific devices. For example, the device 110 may be associated with domains for music, calendaring, contact lists, device-specific communications, etc. In addition, the natural language component 260 may communicate with an entity library 382, which includes database entries about specific services on a specific device, either indexed by Device ID, Speaker ID, or Household ID, or some other indicator.

Each recognizer 363 may include a named entity recognition (NER) component 362. The NER component 362 attempts to identify grammars and lexical information that may be used to construe meaning with respect to a textual interpretation input therein. The NER component 362 identifies portions of text represented in text data input into the natural language component 260 that correspond to a named entity that may be recognizable by the system. The NER component 362 (or other component of the natural language component 260) may also determine whether a word refers to an entity that is not explicitly mentioned in the utterance text, for example "him," "her," "it" or other anaphora, exophora or the like.

Each recognizer 363, and more specifically each NER component 362, may be associated with a particular grammar model and/or database 376, a particular set of intents/actions 378, and a particular personalized lexicon 386. Each gazetteer 384 may include domain-indexed lexical information associated with a particular user and/or device. For example, the Gazetteer A (384a) includes domain-index lexical information 386aa to 386an. A user's music-domain lexical information might include album titles, artist names, and song names, for example, whereas a user's contact-list lexical information might include the names of contacts. Since every user's music collection and contact list is presumably different, this personalized information improves entity resolution.

An NER component 362 applies grammar models 376 and lexical information 386 associated with the domain (associated with the recognizer 363 implementing the NER component 362) to determine a mention one or more entities in a textual interpretation input therein. In this manner, the NER component 362 identifies "slots" (i.e., particular words in a textual interpretation) that may be needed for later command processing. The NER component 362 may also label each slot with a type of varying levels of specificity (e.g., noun, place, city, artist name, song name, etc.).

Each grammar model 376 includes the names of entities (i.e., nouns) commonly found in speech about the particular domain (i.e., generic terms) to which the grammar model 376 relates, whereas the lexical information 386 is personalized to the user(s) and/or the device from which the audio data 211 originated. For example, a grammar model 376 associated with a shopping domain may include a database of words commonly used when people discuss shopping.

A downstream process called named entity resolution actually links a portion of text to an actual specific entity known to the system. To perform named entity resolution, the natural language component 260 may utilize gazetteer information (384a-384n) stored in an entity library storage 382. The gazetteer information 384 may be used to match text represented in text data output by the speech recognition component 250 with different entities, such as song titles, contact names, etc. Gazetteers may be linked to users (e.g., a particular gazetteer may be associated with a specific user's music collection), may be linked to certain domains (e.g., shopping, music, video, communications, etc.), or may be organized in a variety of other ways.

Each recognizer 263 may also include an intent classification (IC) component 364. The IC component 364 parses an input textual interpretation to determine an intent(s) of the domain associated with the recognizer 363 that potentially corresponds to the textual interpretation. An intent corresponds to an action to be performed that is responsive to the command represented by the textual interpretation. The IC component 364 may communicate with a database 378 of words linked to intents. For example, a music intent database may link words and phrases such as "quiet," "volume off," and "mute" to a "mute" intent. The IC component 364 identifies potential intents by comparing words in the textual interpretation to the words and phrases in an intents database 378 associated with the domain that is associated with the recognizer 363 implementing the IC component 364.

The intents identifiable by a specific IC component 364 are linked to domain-specific (i.e., the domain associated with the recognizer 363 implementing the IC component 364) grammar frameworks 376 with "slots" to be filled. Each slot of a grammar framework 376 corresponds to a portion of the text interpretation that the system believes corresponds to an entity. For example, a grammar framework 376 corresponding to a <PlayMusic> intent may correspond to textual interpretation sentence structures such as "Play {Artist Name}," "Play {Album Name}," "Play {Song name}," "Play {Song name} by {Artist Name}," etc. However, to make resolution more flexible, grammar frameworks 376 may not be structured as sentences, but rather based on associating slots with grammatical tags.

For example, an NER component 362 may parse a textual interpretation to identify words as subject, object, verb, preposition, etc. based on grammar rules and/or models prior to recognizing named entities in the textual interpretation. An IC component 364 (implemented by the same recognizer 363 as the NER component 362) may use the identified verb to identify an intent. The NER component 362 may then determine a grammar model 376 associated with the identified intent. For example, a grammar model 376 for an intent corresponding to <PlayMusic> may specify a list of slots applicable to play the identified "object" and any object modifier (e.g., a prepositional phrase), such as {Artist Name}, {Album Name}, {Song name}, etc. The NER component 362 may then search corresponding fields in a lexicon 386 associated with the domain associated with the recognizer 363 implementing the NER component 362, attempting to match words and phrases in the textual interpretation the NER component 362 previously tagged as a grammatical object or object modifier with those identified in the lexicon 386.

An NER component 362 may perform semantic tagging, which is the labeling of a word or combination of words according to their type/semantic meaning. An NER component 362 may parse a textual interpretation heuristic grammar rules, or a model may be constructed using techniques such as hidden Markov models, maximum entropy models, log linear models, conditional random fields (CRF), and the like. For example, an NER component 362 implemented by a music domain recognizer 363 may parse and tag a textual interpretation corresponding to "play mother's little helper by the rolling stones" as {Verb}: "Play," {Object}: "mother's little helper," {Object Preposition}: "by," and {Object Modifier}: "the rolling stones." The NER component 362 identifies "Play" as a verb based on a word database associated with the music domain, which an IC component 364 (also implemented by the music domain recognizer 363) may determine corresponds to a <PlayMusic> intent. At this stage, no determination has been made as to the meaning of "mother's little helper" and "the rolling stones," but based on grammar rules and models, the NER component 362 has determined that the text of these phrases relates to the grammatical object (i.e., entity) of the textual interpretation.

The frameworks linked to the intent are then used to determine what database fields should be searched to determine the meaning of these phrases, such as searching a user's gazetteer 384 for similarity with the framework slots. For example, a framework for a <PlayMusic> intent might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 384 does not resolve the slot/field using gazetteer information, the NER component 362 may search the database of generic words associated with the domain (in the knowledge base 372). For example, if the textual interpretation was "play songs by the rolling stones," after failing to determine an album name or song name called "songs" by "the rolling stones," the NER component 362 may search the domain vocabulary for the word "songs." In the alternative, generic words may be checked before the gazetteer information, or both may be tried, potentially producing two different results.

The natural language component 260 may tag the textual interpretation to attribute meaning to the textual interpretation. For example, the natural language component 260 may tag "play mother's little helper by the rolling stones" as: {domain} Music, {intent} Play Music, {artist name} rolling stones, {media type} SONG, and {song title} mother's little helper. For further example, the natural language component 260 may tag "play songs by the rolling stones" as: {domain} Music, {intent} Play Music, {artist name} rolling stones, and {media type} SONG.

Figure 4:
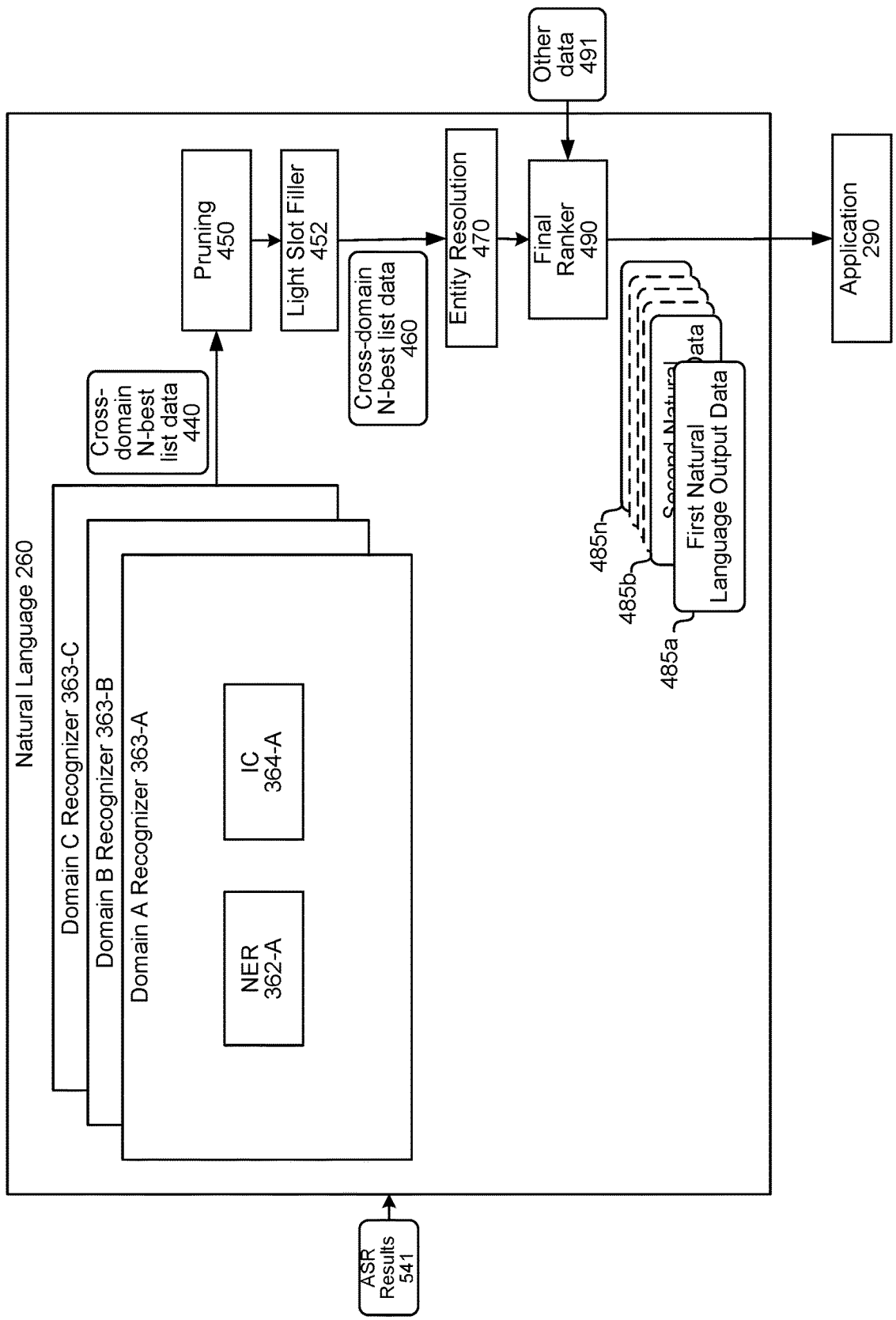
FIG. 4 is a conceptual diagram of how natural language processing is performed according to embodiments of the present disclosure.

Each recognizer 363 may output data corresponding to a single textual interpretation or to an N-best list of textual interpretations. The natural language component 260 may compile the output data of the recognizers 363 into a single cross-domain N-best list, and may send cross-domain N-best list data 440 (representing the cross-domain N-best list) to a pruning component 450 (as illustrated in FIG. 4). The tagged textual interpretations in the cross-domain N-best list data 440 may each be associated with a respect score indicating the tagged textual interpretation corresponds to the domain associated with the recognizer 363 from which the tagged textual interpretation was output. For example, the cross-domain N-best list data 440 may be represented as:

[0.95] Intent: <PlayMusic> ArtistName: Lady Gaga SongName: Poker Face

[0.70] Intent: <PlayVideo> ArtistName: Lady Gaga VideoName: Poker Face

[0.01] Intent: <PlayMusic> ArtistName: Lady Gaga AlbumName: Poker Face

[0.01] Intent: <PlayMusic>θSongName: Pokerface

The pruning component 450 creates a new, shorter N-best list (i.e., represented in cross-domain N-best list data 460 discussed below) based on the cross-domain N-best list data 440. The pruning component 450 may sort the tagged textual interpretations represented in the cross-domain N-best list data 440 according to their respective scores.

The pruning component 450 may perform score thresholding with respect to the cross-domain N-best list data 440. For example, the pruning component 450 may select textual interpretations represented in the cross-domain N-best list data 440 associated with a score satisfying (e.g., meeting and/or exceeding) a score threshold. The pruning component 450 may also or alternatively perform number of textual interpretation thresholding. For example, the pruning component 450 may select the top scoring textual interpretation(s) associated with each different domain represented in the cross-domain N-best list data 440, with the new cross-domain N-best list data 460 including a total number of textual interpretations meeting or falling below a threshold number of textual interpretations. The purpose of the pruning component 450 is to create a new list of top scoring textual interpretations so that downstream (more resource intensive) processes may only operate on the tagged textual interpretations that most likely correspond to the command input to the system.

The natural language component 260 may also include a light slot filler component 452. The light slot filler component 452 can take text from slots represented in the textual interpretation(s) output by the pruning component 450 and alter it to make the text more easily processed by downstream components. The light slot filler component 452 may perform low latency operations that do not involve heavy operations such as reference to a knowledge base. The purpose of the light slot filler component 452 is to replace words with other words or values that may be more easily understood by downstream components. For example, if a textual interpretation includes the word "tomorrow," the light slot filler component 452 may replace the word "tomorrow" with an actual date for purposes of downstream processing. Similarly, the light slot filler component 452 may replace the word "CD" with "album" or the words "compact disc." The replaced words are then included in the cross-domain N-best list data 460.

The natural language component 260 sends the cross-domain N-best list data 460 to an entity resolution component 470. The entity resolution component 470 can apply rules or other instructions to standardize labels or tokens from previous stages into an intent/slot representation. The precise transformation may depend on the domain (e.g., for a travel domain the entity resolution component 470 may transform a text mention of "Boston airport" to the standard BOS three-letter code referring to the airport). The entity resolution component 470 can refer to an authority source (e.g., a knowledge base) that is used to specifically identify the precise entity referred to in each slot of each textual interpretation represented in the cross-domain N-best list data 460. Specific intent/slot combinations may also be tied to a particular source, which may then be used to resolve the text. In the example "play songs by the stones," the entity resolution component 470 may reference a personal music catalog, Amazon Music account, user profile 602 (described herein), or the like. The entity resolution component 470 may output data including an altered N-best list that is based on the cross-domain N-best list represented in the cross-domain N-best list data 460, but also includes more detailed information (e.g., entity IDs) about the specific entities mentioned in the slots and/or more detailed slot data that can eventually be used by an application 290 which may be incorporated into the server(s) 120 components or pipeline or may be on a separate device(s) in communication with the server(s) 120. The natural language component 260 may include multiple entity resolution components 470 and each entity resolution component 470 may be specific to one or more domains.

The entity resolution component 470 may not be successful in resolving every entity and filling every slot represented in the N-best list represented in the cross-domain N-best list data 460. This may result in the entity resolution component 470 outputting incomplete results. The natural language component 260 may include a final ranker component 490, which may consider such errors when determining how to rank the tagged textual interpretations for potential execution. For example, if a book domain recognizer 363 outputs a tagged textual interpretation including a <ReadBook> intent flag, but the entity resolution component 470 cannot find a book with a title matching the text of the item, the final ranker component 490 may re-score that particular tagged textual interpretation to be given a lower score. The final ranker component 490 may also assign a particular confidence to each tagged textual interpretation input therein. The confidence score of a particular tagged textual interpretation may be affected by whether the tagged textual interpretation has unfilled slots. For example, if a tagged textual interpretation associated with a first domain includes slots that are all filled/resolved, that tagged textual interpretation may be associated with a higher confidence than another tagged textual interpretation including at least some slots that are unfilled/unresolved.

The final ranker component 490 may apply re-scoring, biasing, or other techniques to obtain the most preferred tagged and resolved textual interpretation. To do so, the final ranker component 490 may consider not only the data output by the entity resolution component 470, but may also consider other data 491. The other data 491 may include a variety of information. For example, the other data 491 may include application rating or popularity data. For example, if one application has a particularly high rating, the final ranker component 490 may increase the score of a textual interpretation(s) associated with or otherwise invoking that particular application. The other data 491 may also include information about applications that have been specifically enabled by the user. For example, the final ranker component 490 may assign higher scores to textual interpretations associated with or otherwise invoking enabled applications than textual interpretations associated with or otherwise invoking non-enabled applications. User history may also be considered, such as if the user regularly uses a particular supplemental application or does so at particular times of day. Date, time, location, weather, type of device 110, user ID, context, and other information may also be considered. For example, the final ranker component 490 may consider when any particular applications are currently active (e.g., music being played, a game being played, etc.).

Following final ranking, the natural language component 260 may output natural language output data 485. The natural language component 260 may be sent to the orchestrator component 230, which sends the natural language output data 485 to an appropriate application 290 (e.g., one configured to execute a command based on the textual interpretation represented in the natural language output data 485). The natural language output data 485 may include an indicator of the intent of the textual interpretation along with data associated with the intent, for example an indication that the intent is <PlayMusic> and the music to be played is "Adele." Multiple instances of natural language output data (e.g., 485a-485n) may be output for a given set of text data input into the natural language component 260.

The application(s) 290 provides the server(s) 120 with content responsive to the natural language output data 485 received thereby. If the content is text data that needs to be converted to speech, the orchestrator component 230 sends the content text data to the text-to-speech component 280.

Many commands received by the system may have initiated with an utterance that included the wakeword, as detected by wakeword component 220 of device 110 (explained above). In such instances, the audio data 211 corresponding to the utterance may be sent (for example by the orchestrator 230) directly to the speech processing component 240 for processing, and eventual execution, of the command in the utterance. In other circumstances, however, including those discussed below, the device 110 may send audio data to the server(s) 120 even without the device 110 detecting a wakeword. For example, as explained below, in certain circumstances the server(s) 120 may instruct a device 110 to send to the server(s) 120 audio data corresponding to captured audio even if no wakeword is detected. In such circumstances, the system may operate a detector, such as system directed speech detector 285, to determine if incoming audio data 211 actually includes speech intended for the system as operated by the server(s) 120. If the incoming audio data 211 does include system-intended speech (for example a command to the system, response to a previous command, information for the system, a response to a system-managed communication from another user, etc.), then the system may process such speech as it normally would. If, however, the incoming audio data 211 does not include system-intended speech (for example background noise, speech coming from a television or other component, speech between persons not engaging with a local device 110, etc.), then the system may discard that audio data 211 and thus save computing resources by not performing further processing on the audio data 211. While the system directed speech detector 285 may not be as necessary when the device 110 has first detected a wakeword prior to sending the audio data 211, the system directed speech detector 285 may save computing resources in filtering out non-wakeword non-system directed speech from non-wakeword system directed speech. (Though the system directed speech detector 285 may also be used as a wakeword confirmation component and thus may operate on audio data 211 that was sent post-wakeword detection and/or on audio data 211 that was sent without wakeword detection.)

Figure 5B:
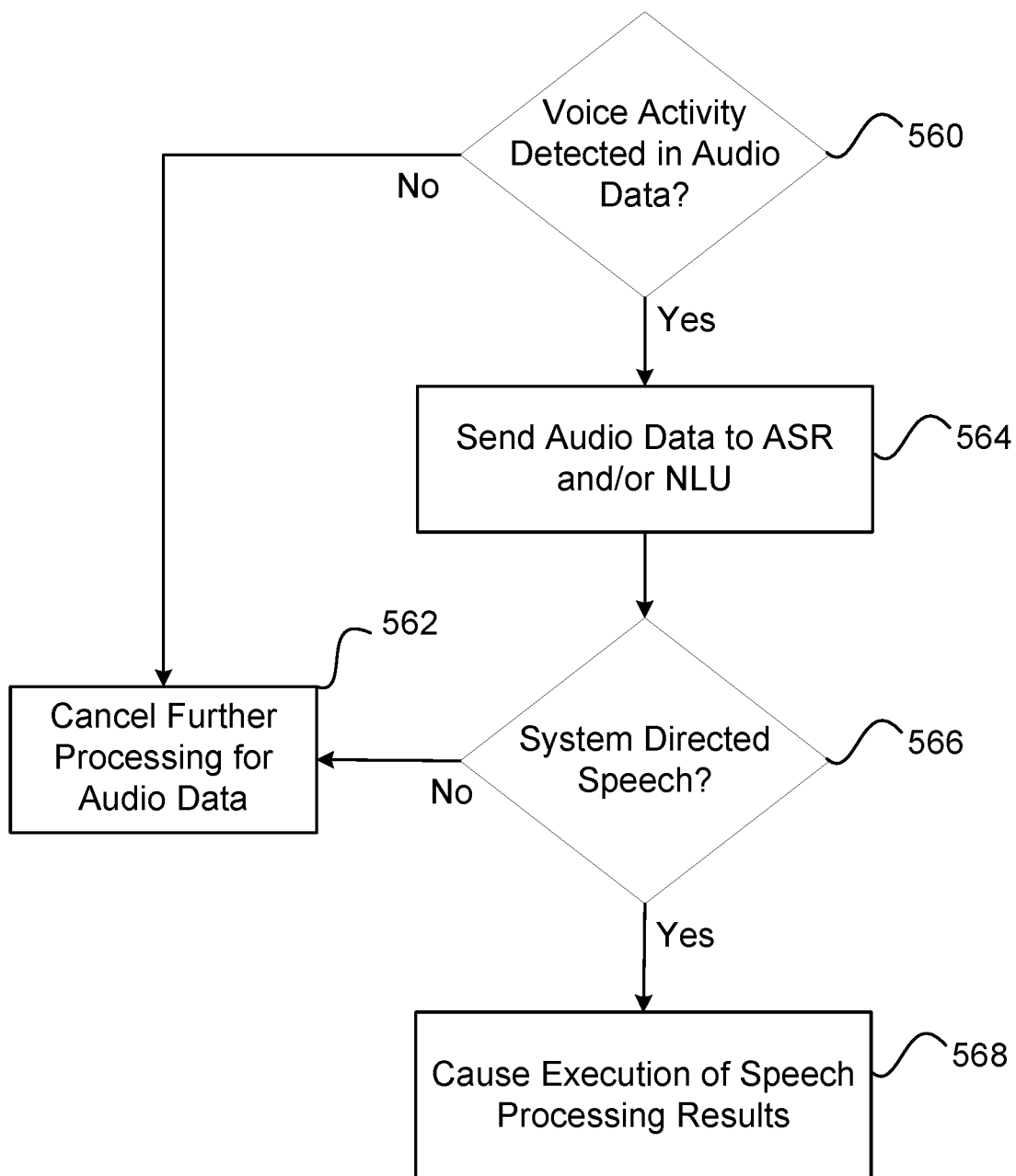
FIG. 5B is a conceptual diagram illustrating a system operating to detect if input audio data includes system directed speech according to embodiments of the present disclosure.

Configuration and operation of the system directed speech detector 285 is illustrated in FIGS. 5A and 5B. As shown in FIG. 5A, the system directed speech detector 285 may include a number of different components. First, the system directed speech detector 285 may include a voice activity detector (VAD) 520. The VAD 520 may operate to detect whether the incoming audio data 211 includes speech or not. The VAD output 521 may be a binary indicator. Thus, if the incoming audio data 211 includes speech, the VAD 520 may output an indicator 521 that the audio data 211 does includes speech (e.g., a 1) and if the incoming audio data 211 does not includes speech, the VAD 520 may output an indicator 521 that the audio data 211 does not includes speech (e.g., a 0). The VAD 520 may also perform start-point detection as well as endpoint detection where the VAD 520 determines when speech starts in the audio data 211 and when it ends in the audio data 211. Thus the VAD output 521 may also include indicators of a speech start point and/or a speech endpoint for use by other components of the system. (For example, the start-point and end-points may demarcate the audio data 211 that is sent to the speech processing component 240.)

The VAD 520 may operate using a variety of VAD techniques, including those described above with regard to VAD operations performed by device 110. The VAD 520 may operate on raw audio data 211 such as that sent by device 110 or may operate on feature vectors representing the audio data 211. For example, the VAD 520 may take the form of a deep neural network (DNN) and may operate on a single feature vector representing the entirety of audio data 211 received from the device or may operate on multiple feature vectors, for example feature vectors representing frames of audio data where each frame covers a certain amount of time of audio data (e.g., 25 ms). The VAD 520 may also use anchored speech detection where the system takes a representation (such as a voice fingerprint, reference feature vector, etc.) of a reference section of speech (such as speech of a voice that uttered a previous command to the system that included a wakeword) and compares a voice detected in the audio data 211 to determine if that voice matches a voice in the reference section of speech. If the voices match, that may be an indicator to the VAD 520 that speech was detected. If not, that may be an indicator to the VAD 520 that speech was not detected. The VAD 520 may also consider other data when determining if speech was detected. The VAD 520 may also consider speaker ID information (such as may be output by user recognition component 295), directionality data that may indicate what direction (relative to the capture device 110) the incoming audio was received from. Such directionality data may be received from the device 110 and may have been determined by a beamformer or other component of device 110. The VAD 520 may also consider data regarding a previous utterance which may indicate whether the further audio data received by the system is likely to include speech. Other VAD techniques may also be used.

If the VAD output 521 indicates that no speech was detected the system (through orchestrator 230 or some other component) may discontinue processing with regard to the audio data 211, thus saving computing resources that might otherwise have been spent on other processes (e.g., ASR for the audio data 211, etc.). If the VAD output 521 indicates that speech was detected, the system may make a determination as to whether the speech was or was not directed to the speech-processing system. Such a determination may be made by the system directed detector 540. The system directed detector 540 may include a trained model, such as a DNN, that operates on a feature vector which represent certain data that may be useful in determining whether or not speech was directed to the system. To create the feature vector operable by the system directed detector 540, a feature extractor 530 may be used. The feature extractor 530 may input ASR results 541 which include results from the processing of the audio data 211 by the speech recognition component 250.

The ASR results 541 may include an N-best list of top scoring ASR hypotheses and their corresponding scores, portions (or all of) an ASR lattice with scores, portions (or all of) an ASR search graph with scores, portions (or all of) an ASR confusion network with scores, or other such ASR output. As an example, the ASR results 541 may include a trellis, which may include a raw search graph as scored during ASR decoding. The ASR results 541 may also include a lattice, which may be a trellis as scored that has been pruned to remove certain hypotheses that do not exceed a score threshold or number of hypotheses threshold. The ASR results 541 may also include a confusion network where paths from the lattice have been merged (e.g., merging hypotheses that may share all or a portion of a same word). The confusion network may be a data structure corresponding to a linear graph that may be used as an alternate representation of the most likely hypotheses of the decoder lattice. The ASR results 541 may also include corresponding respective scores (such as for a trellis, lattice, confusion network, individual hypothesis, N-best list, etc.).

The ASR results 541 (or other data 591) may include other ASR result related data such as other features from the ASR system or data determined by another component. For example, the system may determine an entropy of the ASR results (for example a trellis entropy or the like) that indicates a how spread apart the probability mass of the trellis is among the alternate hypotheses. A large entropy (e.g., large spread of probability mass over many hypotheses) may indicate the ASR component 250 being less confident about its best hypothesis, which in turn may correlate to detected speech not being device directed. The entropy may be a feature included in other data 591 to be considered by the system directed detector 540.

The system may also determine and consider ASR decoding costs, which may include features from Viterbi decoding costs of the ASR. Such features may indicate how well the input acoustics and vocabulary match with the acoustic models 253 and language models 254. Higher Viterbi costs may indicate greater mismatch between the model and the given data, which may correlate to detected speech not being device directed. Confusion network feature may also be used. For example, an average number of arcs (where each arc represents a word) from a particular node (representing a potential join between two words) may measure how many competing hypotheses there are in the confusion network. A large number of competing hypotheses may indicate that the ASR module 250 is less confident about the top hypothesis, which may correlate to detected speech not being device directed. Other such features or data from the ASR results 541 may also be used as other data 591.

The ASR results 541 may be included in a system directed detector (SDD) feature vector 531 that can be used to determine whether speech was system-directed. Such ASR results may be helpful in determining if speech was system-directed. For example, if ASR results include a high scoring single hypothesis, that may indicate that the speech represented in the audio data 211 was directed at, and intended for, the device 110. If, however, ASR results do not include a single high scoring hypothesis, but rather many lower scoring hypotheses, that may indicate some confusion on the part of the speech recognition component 250 and may also indicate that the speech represented in the audio data 211 was not directed at, nor intended for, the device 110.

The feature extractor 530 may also incorporate in an SDD feature vector 531 representations of other data 591. Other data 591 may include, for example, word embeddings from words output by the speech recognition component 250 may be considered. Other data 591 may include, for example, word embeddings from words output by the speech recognition component 250 may be considered. Word embeddings are vector representations of words or sequences of words that show how specific words may be used relative to other words, such as in a large text corpus. A word embedding may be of a different length depending on how many words are in a text segment represented by the word embedding. For purposes of the feature extractor 530 processing and representing a word embedding in an SDD feature vector 531 (which may be of a fixed length), a word embedding of unknown length may be processed by a neural network with memory, such as an LSTM (long short term memory) network. Each vector of a word embedding may be processed by the LSTM which may then output a fixed representation of the input word embedding vectors.

Other data 591 may also include, for example, NLU output from the natural language 260 component may be considered. Thus, if natural language output data 485 indicates a high correlation between the audio data 211 and an out-of-domain indication (e.g., no intent classifier scores from ICs 364 or overall domain scores from recognizers 363 reach a certain confidence threshold), this may indicate that the audio data 211 does not include system-directed speech. Other data 591 may also include, for example, an indicator of a user/speaker as output user recognition component 295. Thus, for example, if the user recognition component 295 does not indicate the presence of a known user, or indicates the presence of a user associated with audio data 211 that was not associated with a previous utterance, this may indicate that the audio data 211 does not include system-directed speech.

Other data 591 may also include image data. For example, if image data is detected from one or more devices that are nearby to the device 110 (which may include the device 110 itself) that captured the audio data being processed using the system directed speech detector (285), the image data may be processed to determine whether a user is facing an audio capture device for purposes of determining whether speech is system-directed.

Other data 591 may also dialog history data. For example, the other data 591 may include information about whether a speaker has changed from a previous utterance to the current audio data 211, whether a topic of conversation has changed from a previous utterance to the current audio data, how NLU results from a previous utterance compare to NLU results obtained using the current audio data 211, other system context information, or the like.

Other data 591 may also include information from the user profile.

Other data 591 may also include direction data, for example data regarding a direction of arrival of speech detected by the device, for example a beam index number, angle data, or the like. If second audio data is received from a different direction than first audio data (such as the audio data explained below in reference to FIGS. 7A-7C), then the system may be less likely to declare the second audio data to include system-directed speech since it is originating from a different location.

Other data 591 may also include acoustic feature data such as pitch, prosody, intonation, volume, or other data descriptive of the speech in the audio data 211. As a user may use a different vocal tone to speak with a machine than with another human, acoustic feature information may be useful in determining if speech is device-directed.

Other data 591 may also include an indicator that indicates whether the audio data 211 includes a wakeword. For example, if a device 110 detects a wakeword prior to sending the audio data 211 to the server(s) 120, the device 110 may send along an indicator that the device 110 detected a wakeword in the audio data 211. In another example, the server(s) 120 may include another component that processes incoming audio data 211 to determine if it includes a wakeword. If it does, the component may create an indicator indicating that the audio data 211 includes a wakeword. The indicator may then be included in other data 591 to be incorporated in the feature vector 531 and/or otherwise considered by the system directed detector 540.

Other data 591 may also include device history data such as information about previous operations related to the device 110 that sent the audio data 211. For example, the other data 591 may include information about a previous utterance that was just executed, where the utterance originated with the same device 110 as a current utterance and the previous utterance was within a certain time window of the current utterance. Device history data may be stored in a manner associated with the device identifier (which may also be included in other data 591), which may also be used to track other information about the device, such as device hardware, capability, location, etc.

The other data 581 used by the VAD 520 may include similar data and/or different data from the other data 591 used by the feature extractor 530.

The feature extractor 530 may output a single SDD feature vector 531 for one utterance/instance of input audio data 511. The SDD feature vector 531 may consistently be a fixed length, or may be a variable length vector depending on the relevant data available for particular audio data 211. Thus, the system directed detector 540 may output a single SDD result 541 per utterance/instance of input audio data 511. The SDD result 541 may be a binary indicator. Thus, if the incoming audio data 211 includes system-directed speech, the system directed detector 540 may output an indicator 541 that the audio data 211 does includes system-directed speech (e.g., a 1) and if the incoming audio data 211 does not includes system-directed speech, the system directed detector 540 may output an indicator 541 that the audio data 211 does not system-directed includes speech (e.g., a 0). Although not illustrated in FIG. 5A, the flow of data to and from the system directed speech detector 285 may be managed by the orchestrator 230 or by one or more other components.

The trained model(s) of the system directed detector 540 may be trained on many different examples of SDD feature vectors that include both positive and negative training samples (e.g., samples that both represent system-directed speech and non-system directed speech) so that the DNN and/or other trained model of the system directed detector 540 may be capable of robustly detecting when speech is system-directed versus when speech is not system-directed.

The process for determine whether incoming audio data 211 includes system-directed speech (for example using system directed speech detector 285) is illustrated in FIG. 5B. As shown, the system detects (560) if there is voice activity in the detected audio data 211, for example using VAD 520. If there is no voice activity detected (560: No) (e.g. VAD output 521 indicates no voice activity), the system may cancel (562) further processing for the audio data. In addition, if there is no voice activity detected (560: No), the system may send an instruction to the device 110 to stop sending audio data to the server(s) 120. If there is voice activity detected (560: Yes) (e.g. VAD output 521 indicates voice activity), the system may send (564) the audio data for ASR/NLU processing by the speech processing components 240. The system then determines whether (566) detected speech is system-directed, for example using the feature extractor 5 and system directed detector 540. If the speech is not determined to be system-directed (566: No) (e.g. SDD result 541 indicates no system-directed speech), the system may cancel (562) further processing for the audio data. In addition, if the speech is not determined to be system-directed (566: No), the system may send an instruction to the device 110 to stop sending audio data to the server(s) 120. If the speech is determined to be system-directed (566: Yes) (e.g. SDD result 541 indicates system-directed speech), the system may cause (568) execution of speech processing results which may include continuing speech processing (e.g., NLU processing) if not already complete, sending speech processing results to further components such as an application 290 for further action, etc. The system may also update the system context to reflect actions taken by the system since detecting the audio data 211 and processing the various ASR and/or NLU results.

Figure 6:
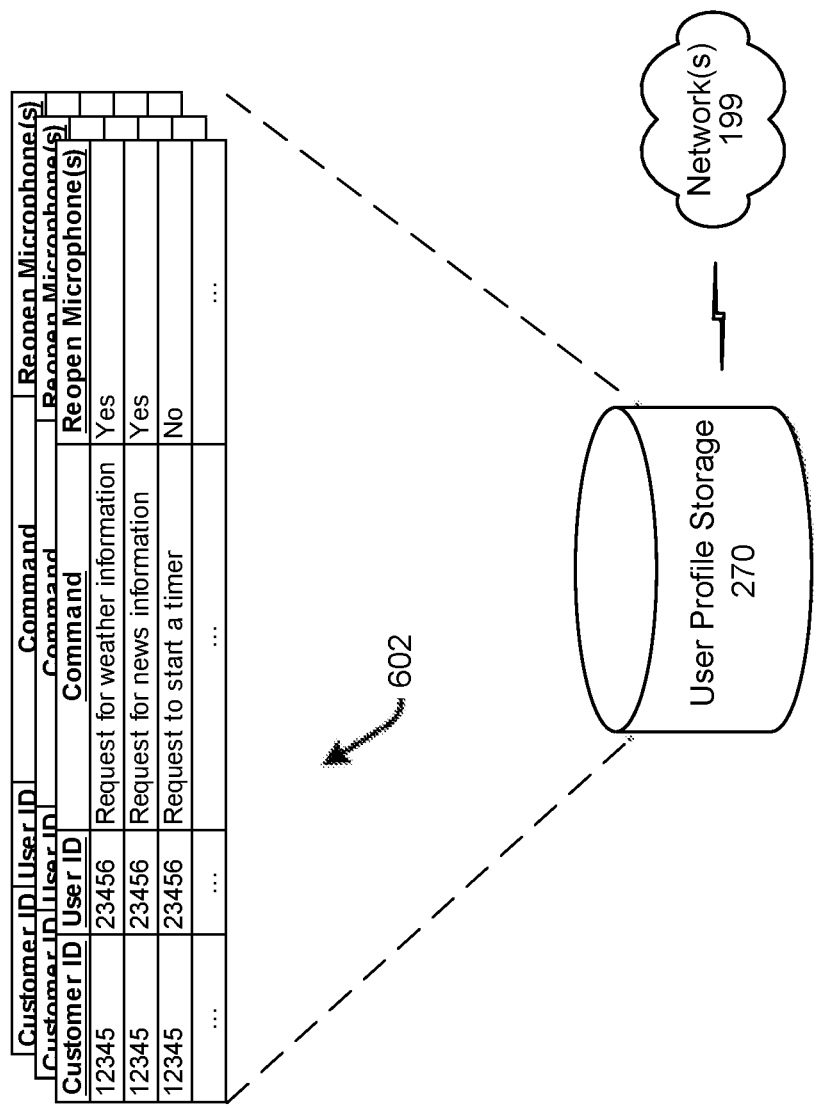
FIG. 6 illustrates data stored and associated with user profiles according to embodiments of the present disclosure.

FIG. 6 illustrates the user profile storage 270 that includes data regarding customer profiles as well as individual user profiles 602. For illustration, as shown in FIG. 6, each user profile 602 may include information indicating system executable commands that are enabled with respect to the user profile. Each enabled command may be associated with a user preference regarding whether a device should remain connected to the server, and continue sending audio to the server, after content responsive to the command is output by the device. Moreover, an enabled command associated with a user preference indicating a device's connection to the server may additionally be associated with a user preference regarding how long the device should be connected to the server prior to the device re-entering sleep mode and again requiring the user speak a keyword to input a command. A user profile may also include data regarding other user specific features such as likelihood of the user speaking multiple commands in succession, the user's dialog history regarding previous utterances spoken to the system, etc. Each user profile 602 may additionally include other data not explicitly illustrated.

A user may speak various types of commands to the system (e.g., requests for information to be output, request for music to be streamed, etc.). A user may also speak a command causing the system to cease output of content presently being output. For example, while the system is streaming music to the user, the user may say "stop output of music," "cancel," or the like. In response, the system ceases output of the music to the user. The user may speak such a command to the system because the user is about to begin a meeting, because the user wants to stop interacting with the system for the moment, etc. Thus, when a user speaks a command to the system to cease output of content, the system may be configured to not re-enable the device to which the user spoke the command to send further audio without first detecting a wakeword.

Figure 7A:
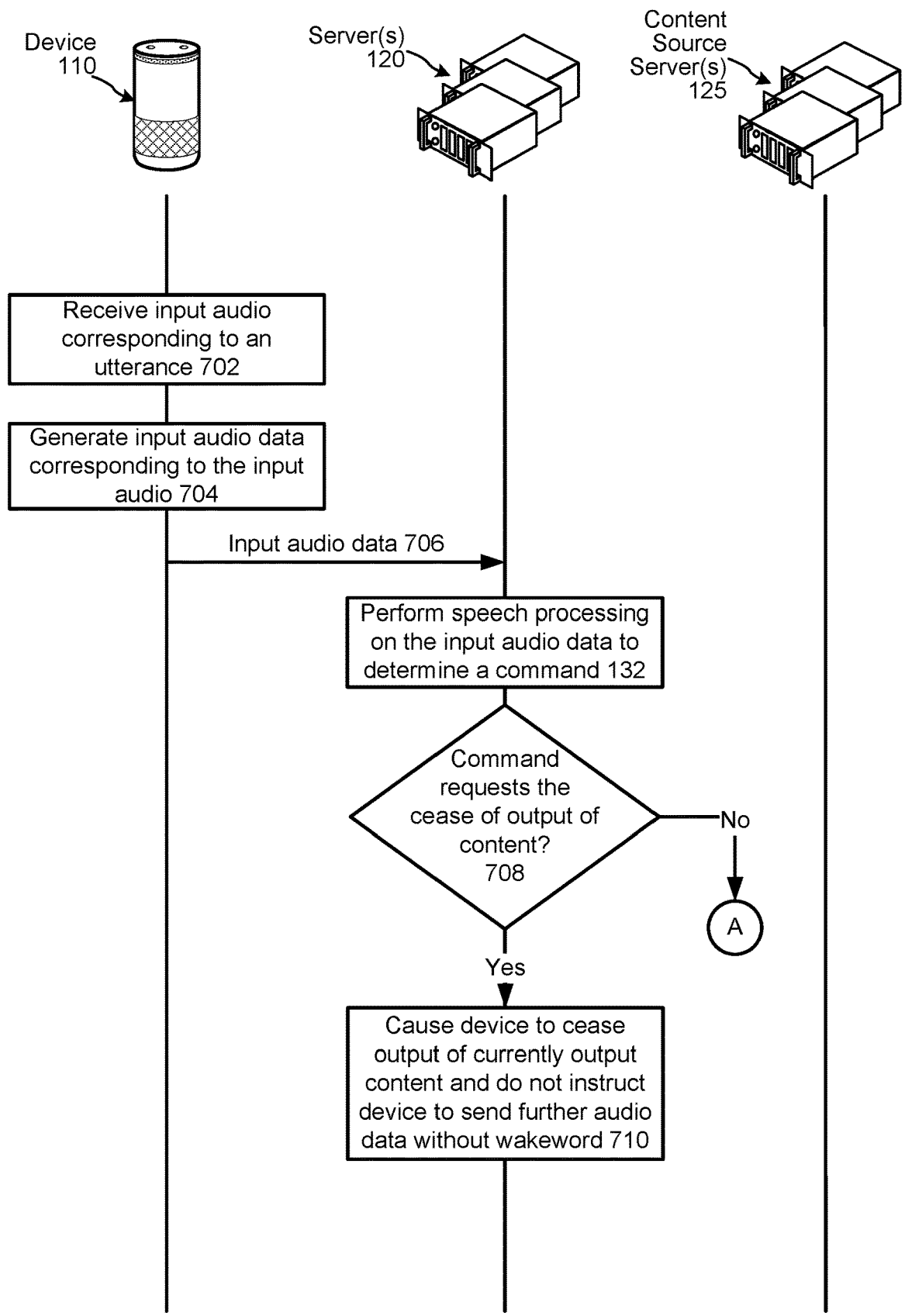
FIGS. 7A and 7B are a signal flow diagram illustrating the processing performed when a command to cease output of content is input to a system according to embodiments of the present disclosure.
Figure 7B:
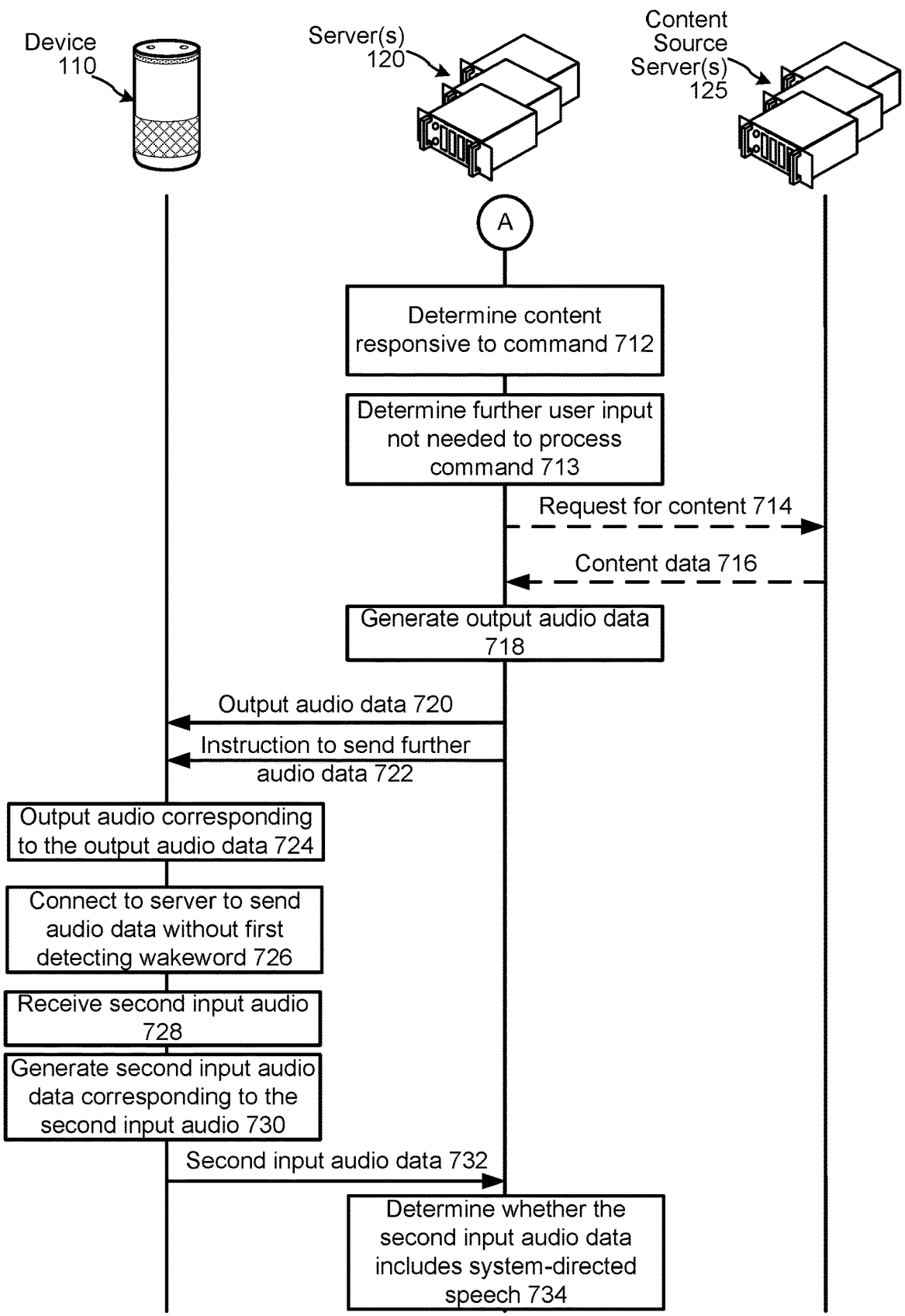

FIGS. 7A and 7B illustrate the processing performed when a command to cease output of content is input to the system. A device 110 receives (702) input audio corresponding to an utterance. The device 110 generates (704) input audio data corresponding to the input audio and sends (706) the input audio data to the server(s) 120.

The server(s) 120 performs (132) speech processing on the input audio data to determine a command. The server(s) 120 determines (708) whether the command corresponds to a request for content being output to no longer be output. For example, the system may be outputting music or video content, and the command may request the music or video content no longer be output. Such a command may corresponding to speech such as "cancel," "cease output," "pause," or the like. A command may implicitly correspond to a request for the system to cease output of currently output content. The server(s) 120 may implement at least one trained classifier to determine whether a command implicitly requests currently output content cease being output.

If the server(s) 120 determines the command requests content no longer be output, the server(s) 120 causes (710) the device 110 to cease output of currently output content and does not send an instruction to the device 110 to send further audio data without first detecting a wakeword. For example, if the server(s) 120 is continuously sending the currently output content to the device 110 so the device 110 can stream the content to the user, the server(s) 120 may simply cease sending content to the device. If the server(s) 120 previously sent the device 110 the entirety of the currently output content, the server(s) 120 may send to the device 110 an instruction to cease output of the currently output content. Conversely, if the server(s) 120 determines the command does not request content no longer be output, the server(s) 120 determines (712) content responsive to the command. The server(s) 120 may also determine (713) that further user input (in the form of audio data or the like) is not needed to complete processing of the command. The server(s) 120 may determine the content using a 1P application. Alternatively, the server(s) 120 may determine the server(s) 120 should invoke a 3P skill operated by a content source server(s) 125 to determine the content. In such a situation, the server(s) 120 may send (714) a request for content responsive to the command to the content source server(s) 125. In return, the server(s) 120 may receive (716) content data. The server(s) 120 may alternatively receive the content data as audio data, in which case the server(s) 120 simply sends the received content data to the device 110 as output audio data.

If content data is received as text data, the server(s) 120 may perform text-to-speech processing on the text data to generate (718) output audio data. The server(s) 120 sends (720) the output audio data to the device. The server(s) 120 may also send (722) an instruction to the device 110 to send further input audio data corresponding to further captured audio without detecting a wakeword even though the system does not need further user input to complete processing of the initial command. For example, the instruction may instruct the device 110 to send the first thirty (30) seconds of audio captured without a wakeword.

The device 110 outputs (724) audio corresponding to the output audio data. If the device 110 receives the instruction from the server, the device 110 may connect (726) to the server to send audio data without first detecting a wakeword, receive (728) second input audio, generate (730) second input audio data corresponding to the second input audio, and send (732) the second input audio data to the server(s) 120 without first detecting a wakeword or performing VAD techniques. Upon receiving the second input audio data, the server(s) 120 determines (734) whether the second input audio data includes system-directed speech using the components and steps illustrated in and described with respect to FIGS. 5A and 5B. If the server(s) 120 determines the second input audio data includes system-directed speech, the server(s) 120 then operates on the second input audio data to ultimately provide user with content responsive to a command represented in the second input audio data.

The server(s) 120 may instruct the device 110 to activate a light indicator (e.g., a light ring) upon detecting a spoken wakeword. The server(s) 120 may then cause the device 110 to deactivate the light indicator while the server(s) 120 processes audio data sent thereto by the device 110. The server(s) 120 may further instruct the device 110 to reactivate the light indicator once content responsive to a command is output and the device is sending audio data to the server(s) 120. The server(s) 120 instructs the device 110 to, once again, deactivate the light indicator once a time out period has transpired and the device 110 stops sending audio data to the server(s) 120.

In other situations, the device 110 may be configured to display content in addition to outputting audio. In such situations, if the server(s) 120 receives the content data as text data, the server(s) 120 may simply send the received content data as output text data to the device 110, which the device 110 displays as text. If the server(s) 120 receives the content data as audio data, the server(s) 120 may perform speech recognition processing on the audio data to generate output text data, which the server(s) 120 sends to the device 110 for display as text.

A user may also speak a command to the system that results in dialog driven slot filling. For example, the user may say "order me a pizza." In order for the system to order the user a pizza, the system may need more information from the user, such as the establishment to order the pizza from, the type of pizza the user wants, when the user wants the pizza finished, etc. The system may engage in dialog driven slot filling to receive the additional information needed. For example, after the system receives the user's command of "order me a pizza," the system may output computerized speech corresponding to "where should I order the pizza from." In response to the user speaking to the system the place from which the system should order pizza, the system may then output computerized speech corresponding to "what kind of pizza would you like." In response to the user speaking to the system the kind of pizza, the system may output computerized speech corresponding to "what time do you want the pizza delivered." The user may then speak to the system a delivery time. The system and user may engage in multiple rounds of dialog until the system has all the information needed to execute the initial command (e.g., ordering a pizza according to the aforementioned example).

Dialog driven slot filling may be considered to occur during a single turn since dialog driven slot filling occurs between the speaking of a command and the execution of the command. Moreover, dialog driven slot filling may be directed by a 1P or 3P application that will ultimately execute the spoken command. Each application may cause the system to cause the device 110 to continue to send audio data corresponding to further captured audio after synthesized speech soliciting further information is output to the user. That is, for a 3P application, a content source server(s) 125 operating the 3P application may send an instruction to the server(s) 120 to output synthesized speech requesting certain information as well as send an instruction to the server(s) 120 to cause the device 110 to capture user speech corresponding to the requested information (and potentially without the wakeword) once the synthesized speech is done being output. Since the content source server(s) 125 directs the server(s) 120 as to when to cause the device 110 to send audio data without first detecting a wakeword, the server(s) 120 may not necessarily make its own determination of when to cause the device 110 to send non-wakeword audio data when a command resulting in dialog driven slot filling is received.

FIG. 8 illustrates the processing performed when a command resulting in dialog driven slot filling is input to the system. Upon performing (132) speech processing on input audio data to determine a command, the server(s) 120 determines (802) an application configured to execute the command. The server(s) 120 then determines (804) whether the command, as executed by the application, will require dialog driven slot filling. If dialog driven slot filling will be required, the server(s) 120 causes (806) the device to send audio data without first detecting a wakeword as directed by the application. If dialog driven slot filling will not be required, the system performs some or all of steps 712 through 726 described with respect to FIGS. 7A and 7B.

As an extension of FIG. 8, in response to receiving a request for content, the content source server(s) 125 may send an instruction to the device 110 to send further audio data without first capturing a wakeword. If the server(s) 120 detects the instruction, the server(s) 120 may not send a separate instruction to cause the device 110 to send further audio data without first capturing a wakeword.

A user may speak various commands to the system. Sometimes, the user may speak a command that is unrecognized by the system (e.g., the system is not configured to executed the command). Other times, the user may speak a command to the system, but the system has low confidence that its determined command corresponds to the command actually spoken by the user. FIG. 9 illustrates the processing performed in such situations.

The server(s) 120 performs (902) speech recognition processing on input audio data to determine input text data as well as a speech recognition confidence score indicating a likelihood that the input audio data corresponds to the input text data. The server(s) 120 also performs (904) natural language processing on the input text data to determine a command as well as a natural language confidence score indicating a likelihood that the input text data corresponds to the command.

The server(s) 120 determines (906) whether the speech recognition confidence score and the natural language confidence score satisfy (e.g., meet or exceed) a threshold confidence score. The speech recognition confidence score may be compared against a threshold speech recognition score and the natural language confidence score may be compared against a threshold natural language score, or the speech recognition confidence score and the natural language confidence score may each be compared against a single threshold score. Speech recognition processing may output an N-best list of speech recognition confidence scores. Likewise, natural language processing may output an N-best list of natural language confidence scores. In such instances, the top scoring item in the N-best list(s) may be compared to an appropriate threshold score.

If the server(s) 120 determines one or both of the speech recognition confidence score (or the top score in an N-best list) and the natural language confidence score (or the top score in an N-best list) satisfies an applicable threshold score, the server(s) 120 generates (908) output audio data corresponding to synthesized speech indicating the input command is not recognized/not executed. The server(s) 120 sends (910) the output audio data to the device 110, which outputs (912) audio corresponding to the output audio data.

If the server(s) 120 determines both of the speech recognition confidence score (or the top score in an N-best list) and the natural language confidence score (or the top score in an N-best list) satisfy one or more applicable threshold scores, the system performs some or all of steps 712 through 726 described with respect to FIGS. 7A and 7B.

A user may speak a command to the system to output long-form content, such as music or multimedia content including video and audio. The system may not cause a device used to output the long-form streaming content to send further audio data corresponding to audio captured during output of the long-form streaming content, as that may be disruptive to the user.

Long-form content may also include voice over Internet Protocol (VOIP) communications as well as other communications where two users communicate via two different devices 110 over an extended length of time. In long-form communication situations, a communication channel may be established between at least two devices 110. In such situations, it may be unbeneficial for the system to receive non-wakeword audio of the devices 110 associated with the communication channel, outside of the communication channel context. Thus, long-form content as used herein is not limited to situations where the system causes non-user generated content to be output to a user.

Figure 10A:
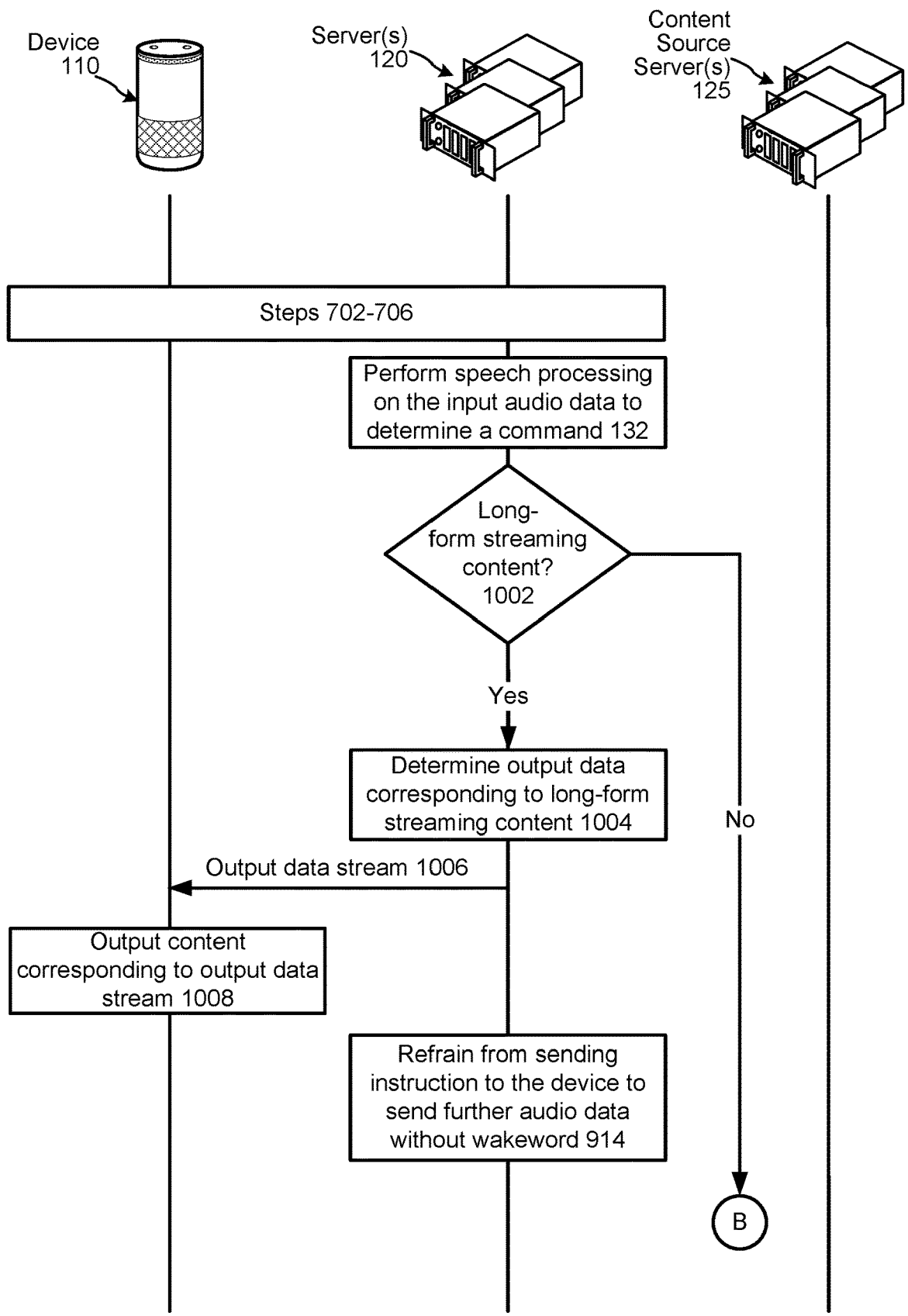
FIGS. 10A and 10B are a signal flow diagram illustrating the processing performed when a command requesting the output of long-form streaming content is input to a system according to embodiment of the present disclosure.
Figure 10B:
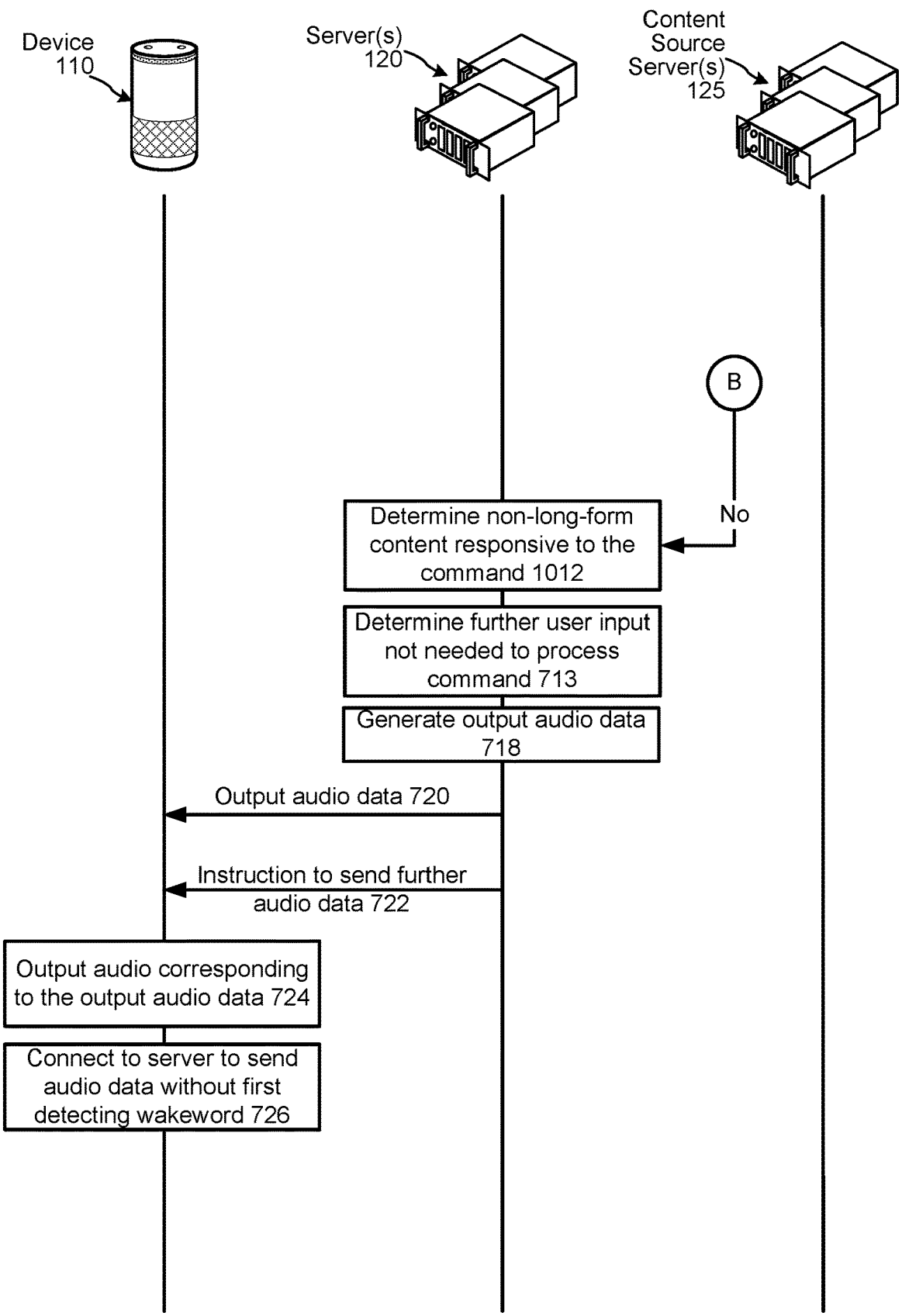

FIGS. 10A and 10B illustrate the processing performed when a command requesting the output of long-form streaming content is input to the system. Upon performing (132) speech processing on input audio data to determine a command, the server(s) 120 determines (1002) whether the command requests the output of long-form streaming content. Long-form streaming content may be content having an output duration above a threshold output duration.

If the server(s) 120 determines the command requests the output of long-form streaming content, the server(s) 120 determines (1004) output data corresponding to the long-form streaming content. The server(s) 120 may determine the output data from a 1P application or a 3P application. The server(s) 120 streams (1006) the output data to the device 110. The device 110 outputs (1008) content as the output data stream is received. The server(s) 120 also refrains (914) from sending an instruction to the device 110 that would cause the device 110 to send further audio data without first determining whether the audio data includes speech corresponding to a wakeword.

If the server(s) 120 determines the command does not request the output of long-form streaming content, the server(s) 120 determines (1012) non-long-form content responsive to the command. Non-long-form content may include content that may be sent in a non-streaming transmission to the device 110. The server(s) 120 may also determine (713) that further user input (in the form of audio data or the like) is not needed to complete processing of the command. The server(s) 120 sends (720) output audio data corresponding to the non-long-form content to the device 110. The server(s) 120 also sends (722) an instruction to the device 110 to send further audio data without first detecting a wakeword. The device 110 outputs (724) audio corresponding to the output audio data and, thereafter, connects (726) to the server to send audio data to the server without first determining whether the audio data includes speech corresponding to a wakeword.

As described, a user may speak various commands to the system. The commands may range in a variety of topics as well as a variety of types of content to be output. Some of the commands may be related. That is, when a first command is input to the system, it may be likely that a second command will be input to the system thereafter based on the nature of the first and second command. For example, it may be likely that a user will speak a command requesting weather information for a specific location after the user speaks a command requesting the system to book a flight for the user to the location. The system may analyze previous usages of various system users and construct a database of pairs of commands likely to be invoked adjacent in time by any given user.

Figure 11A:
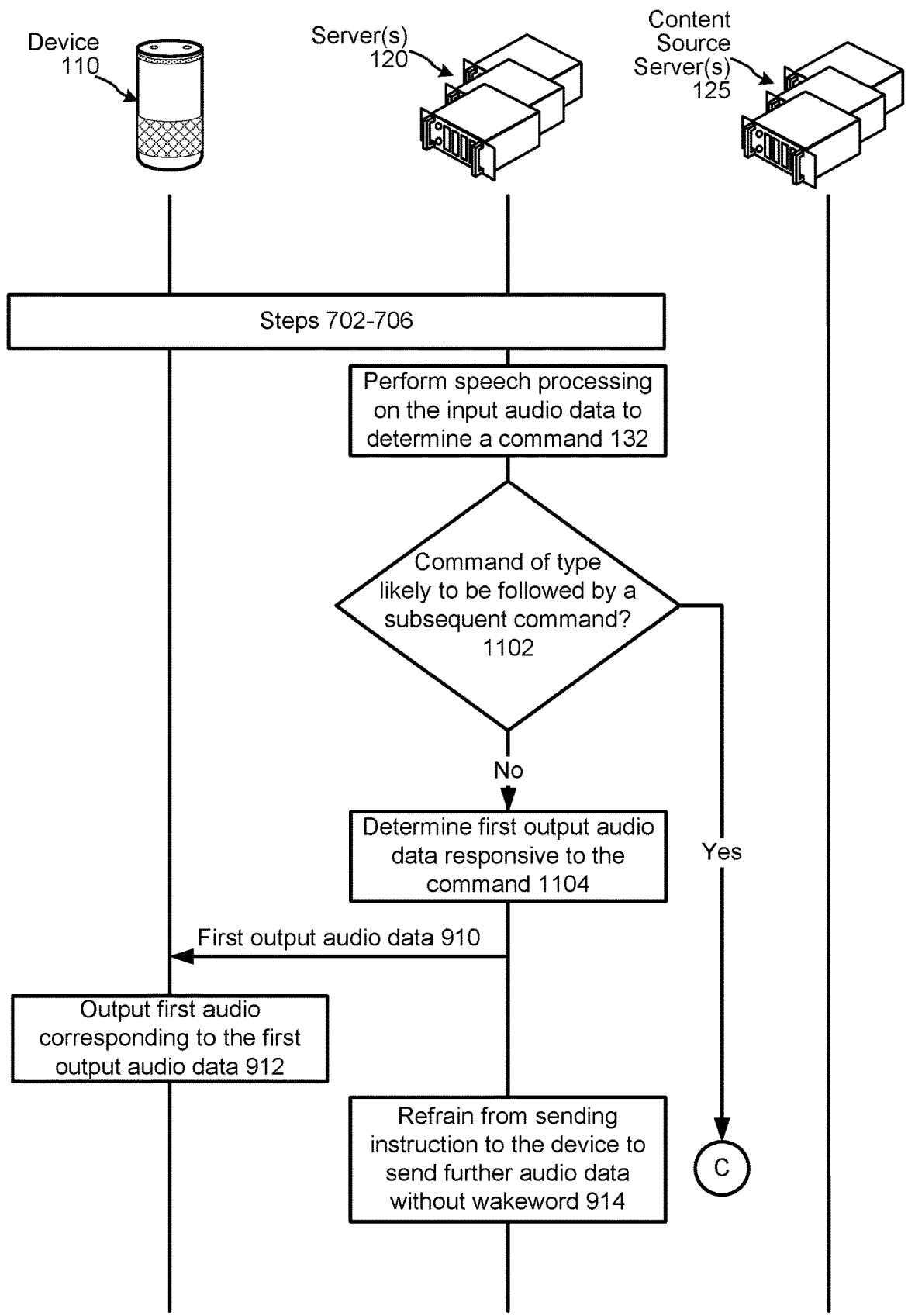
FIGS. 11A and 11B are a signal flow diagram illustrating the processing performed when a command is input to a system according to embodiments of the present disclosure.
Figure 11B:
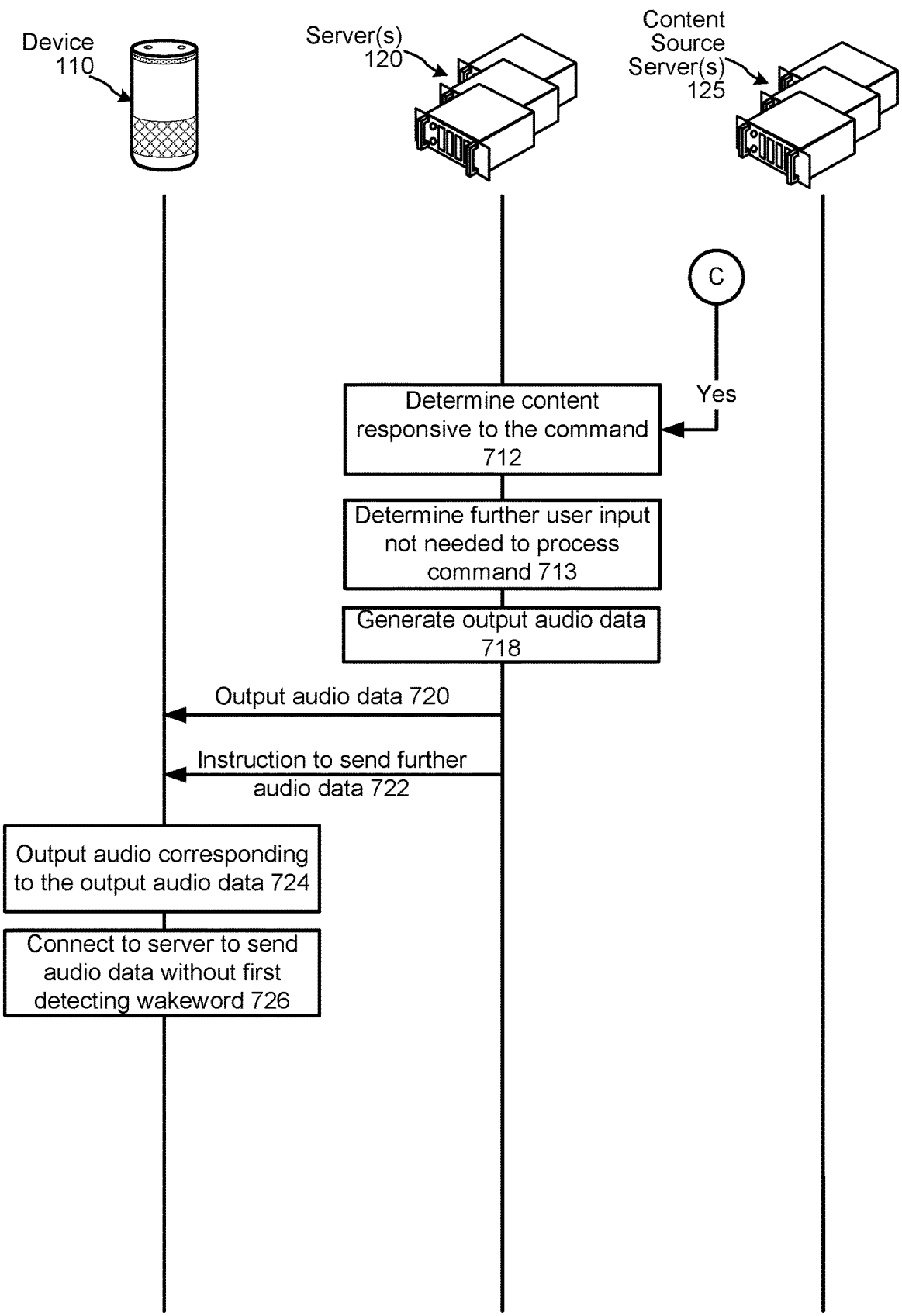

FIGS. 11A and 11B illustrate the processing performed when a command is input to the system. After the server(s) 120 performs (132) speech processing on input audio data to determine a command, the server(s) 120 determines (1102) whether the command is of a type likely to be followed by a subsequent command. For example, the server(s) 120 may analyze system usage histories of multiple users of the system to determine commands that are likely to be spoken adjacent in time. For example, the server(s) 120 may determine a command corresponding to a request to book a flight may be followed by a command for weather information.

If the server(s) 120 determines the command is not of a type likely to be followed by a subsequent command, the server(s) 120 determines (1104) output audio data responsive to the command. The server(s) 120 sends (910) the output audio data to the device 110, which outputs (912) audio corresponding to the output audio data. The server(s) 120 also refrains (914) from sending an instruction to the device 110 that would cause the device 110 to send further audio data without first determining whether the audio data includes speech corresponding to a wakeword.

If the server(s) 120 determines the command is of a type likely to be followed by a subsequent command, the server(s) 120 determines (712) content responsive to the command. The server(s) 120 may also determine (713) that further user input (in the form of audio data or the like) is not needed to complete processing of the command. The server(s) 120 generate (718) output audio data corresponding to the content. The server(s) 120 sends (720) the output audio data to the device 110. The server(s) 120 also sends (722) an instruction to the device 110 to send further audio data without first detecting a wakeword. The device 110 outputs (724) audio corresponding to the output audio data and, thereafter, re-enables sending of audio data to the server without first detecting a wakeword.

Figure 12:
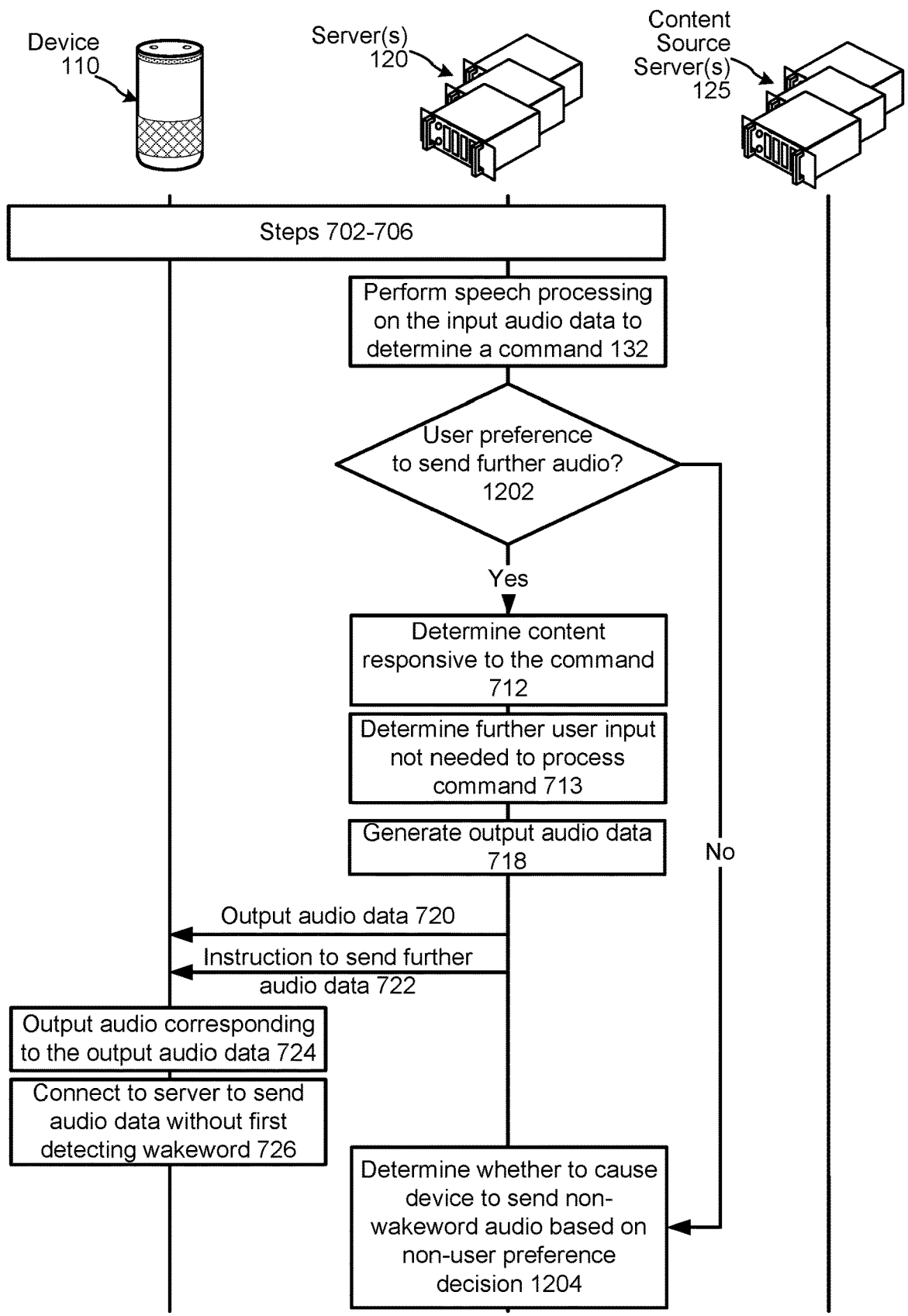
FIG. 12 is a signal flow diagram illustrating the processing performed to determine whether audio data should be sent to a server(s) based on a user preference according to embodiments of the present disclosure.

A user may provide the system with preferences regarding when the user wants the system to cause a device to send non-wakeword triggered audio so the user can speak a subsequent command without having to first speak a keyword. FIG. 12 illustrates the processing performed to determine whether to send non-wakeword triggered audio based on a user preference.

After performing (132) speech processing on input audio data to determine a command, the server(s) 120 determines (1202) whether a user preference to indicates whether further audio data should be sent. For example, the server(s) 120 may determine whether a profile associated with the device 110 and/or the user that spoke the command includes information indicating that further non-wakeword audio should be sent to the system in response to the presently determined input command.

If the server(s) 120 determines a user preference indicates further audio should be sent without a wakeword (1202: Yes), the server(s) 120 determines (712) content responsive to the command. The server(s) 120 may also determine (713) that further user input (in the form of audio data or the like) is not needed to complete processing of the command. The server(s) 120 generates (718) output audio data corresponding to the content. The server(s) 120 sends (720) the output audio data to the device 110. The server(s) 120 also sends (722) an instruction to the device 110 to, upon completing output of audio corresponding to the output audio data, send further audio data without first detecting a wakeword. The device 110 outputs (724) audio corresponding to the output audio data and, thereafter, sends audio data to the server(s) 120 without first detecting a wakeword in the audio data.

If the server(s) 120 determines there is no user preference indicating further audio should be sent without a wakeword (1202: Nos), the server(s) 120 determines (1204) whether it should cause the device 110 to send non-wakeword audio data based on a non-user preference decision (e.g., as described herein above).

Figure 13:
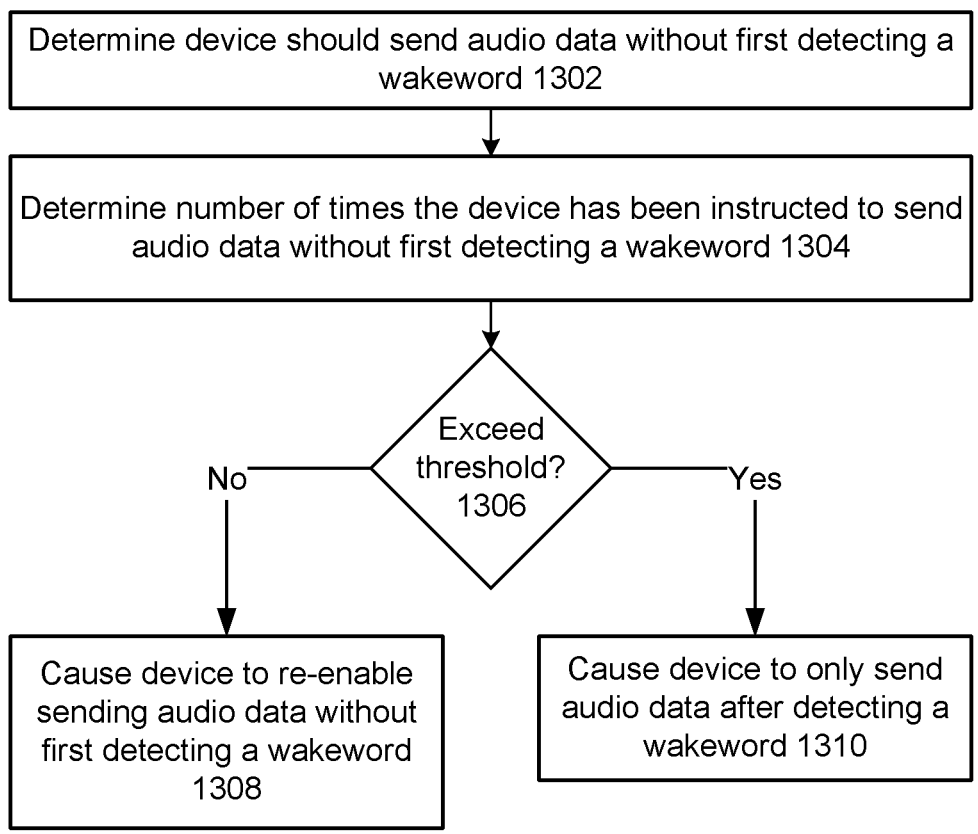
FIG. 13 is a process flow diagram illustrating the processing performed to determine whether a audio data should be sent to a server(s) according to embodiments of the present disclosure.

The system may be configured to only send non-wakeword audio data a certain number of times in a row, after which the system may require a user speak a wakeword to input a subsequent command to the system (as illustrated in FIG. 13). The server(s) 120 determines (1302) the device should send audio data to the server(s) 120 without first detecting the present of a wakeword in the audio data. Such determination may include one or more of the teachings disclosed herein. The server(s) 120 also determines (1304) a number of times the device has been consecutively instructed to send audio data without detection of a wakeword. The server(s) 120 determines (1306) whether the number of times the device has been so instructed exceeds a threshold number of consecutive times. The threshold number of consecutive times may be configurable. If the number of times the device has been consecutively so instructed does not exceed the threshold number of times (1306: No), the server(s) 120 may cause (1308) the device to re-enable sending audio data to the server(s) 120 without first detecting a wakeword in the audio data. If the number of times the device has been consecutively so instructed exceeds the threshold number of times (1306: Yes), the server(s) 120 may cause (1310) the device to only send audio data to the server(s) 120 after detecting a wakeword in captured audio.

The system may also be configured to refrain from enabling a device to send non-wakeword triggered audio data if the initial command corresponded to a request for output of media content (e.g., media content including audio output) regardless of the length of audio output.

Although the above description illustrates the techniques performed with regard to audio data triggered by a wakeword, the techniques may apply to any wake command that instructs a device to send audio data to the server. For example, a button push, gesture, or other action may be considered a wake command. Thus wake command may be substituted for discussions of a wakeword herein. Thus, for any instance herein of the system instructing a device to send (or to cease sending) audio data without first detecting a wakeword may also be considered instructing the device to send (or cease sending) audio data without first detecting any wake command.

Various machine learning techniques may be used to train and operate models to operate various components and perform various steps described above, such as voice activity detection, system directed detection, user recognition, when to instruct a local device to send further audio data without first detecting a wakeword, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks (such as deep neural networks (DNNs)), decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 14:
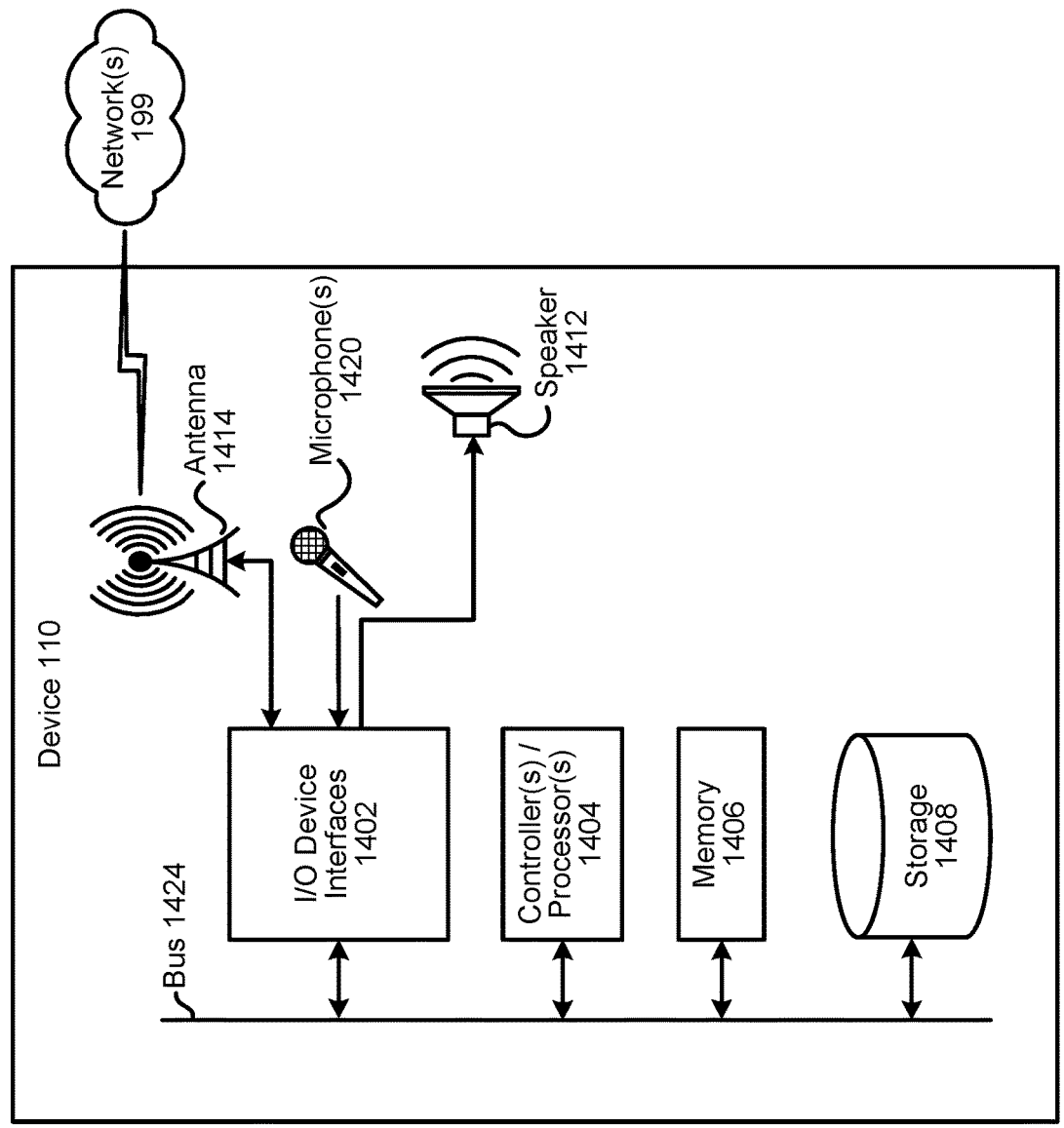
FIG. 14 is a block diagram conceptually illustrating example components of a device according to embodiments of the present disclosure.
Figure 15:
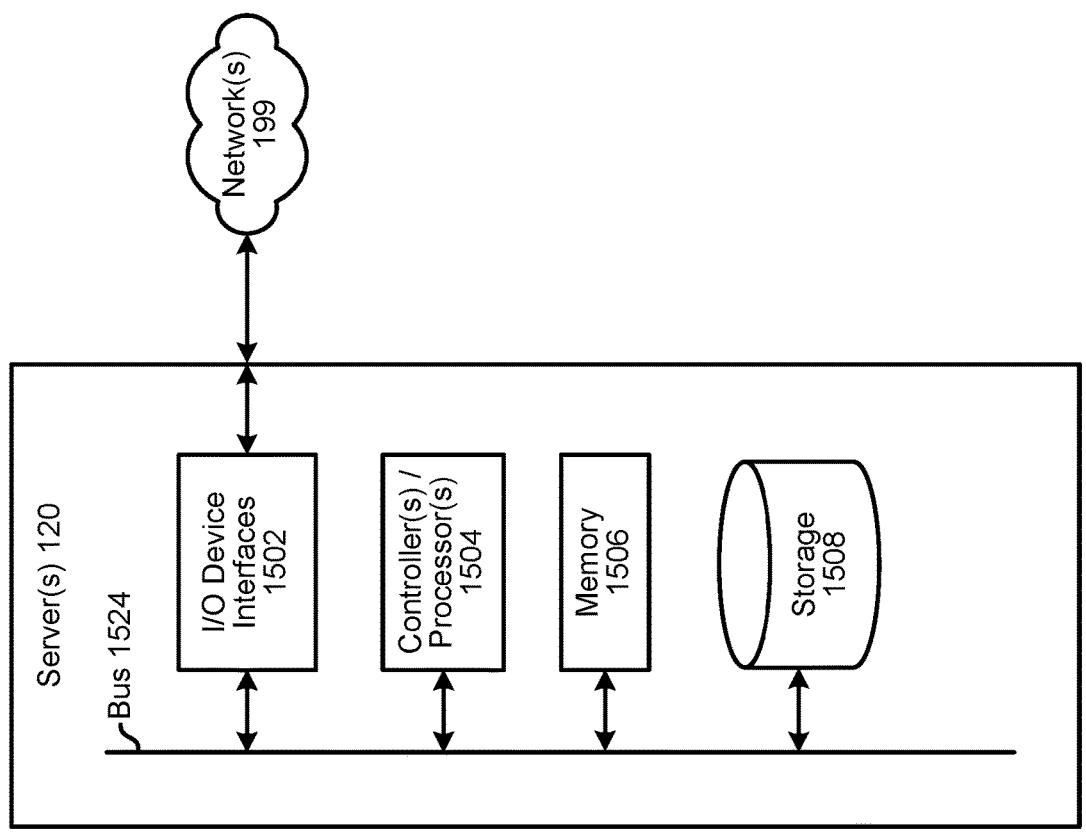
FIG. 15 is a block diagram conceptually illustrating example components of a server according to embodiments of the present disclosure.

FIG. 14 is a block diagram conceptually illustrating a user device 110 that may be used with the system. FIG. 15 is a block diagram conceptually illustrating example components of a remote device, such as the server(s) 120, which may assist with speech recognition processing, natural language processing, or command processing. Multiple servers 120 may be included in the system, such as one server 120 for performing speech recognition processing, one server 120 for performing natural language processing, etc. In operation, each of these devices (or groups of devices) may include computer-readable and computer-executable instructions that reside on the respective device (110/120), as will be discussed further below.

Each of these devices (110/120) may include one or more controllers/processors (1404/1504), which may each include a central processing unit (CPU) for processing data and computer-readable instructions, and a memory (1406/1506) for storing data and instructions of the respective device. The memories (1406/1506) may individually include volatile random access memory (RAM), non-volatile read only memory (ROM), non-volatile magnetoresistive memory (MRAM), and/or other types of memory. Each device (110/120) may also include a data storage component (1408/1508) for storing data and controller/processor-executable instructions. Each data storage component (1408/1508) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (1402/1502).

Computer instructions for operating each device (110/120) and its various components may be executed by the respective device's controller(s)/processor(s) (1404/1504), using the memory (1406/1506) as temporary "working" storage at runtime. A device's computer instructions may be stored in a non-transitory manner in non-volatile memory (1406/1506), storage (1408/1508), or an external device(s). Alternatively, some or all of the executable instructions may be embedded in hardware or firmware on the respective device in addition to or instead of software.

Each device (110/120) includes input/output device interfaces (1402/1502). A variety of components may be connected through the input/output device interfaces (1402/1502), as will be discussed further below. Additionally, each device (110/120) may include an address/data bus (1424/1524) for conveying data among components of the respective device. Each component within a device (110/120) may also be directly connected to other components in addition to (or instead of) being connected to other components across the bus (1424/1524).

Referring to FIG. 1414, the device 110 may include input/output device interfaces 1402 that connect to a variety of components such as an audio output component such as a speaker 1412, a wired headset or a wireless headset (not illustrated), or other component capable of outputting audio. The device 110 may also include an audio capture component. The audio capture component may be, for example, a microphone 1420 or array of microphones, a wired headset or a wireless headset (not illustrated), etc. If an array of microphones is included, approximate distance to a sound's point of origin may be determined by acoustic localization based on time and amplitude differences between sounds captured by different microphones of the array.

Via antenna(s) 1414, the input/output device interfaces 1402 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system 100 may be distributed across a networked environment. The I/O device interface (1402/1502) may also include communication components that allow data to be exchanged between devices such as different physical servers in a collection of servers or other components.

The components of the device(s) 110 and the server(s) 120 may include their own dedicated processors, memory, and/or storage. Alternatively, one or more of the components of the device(s) 110 and the server(s) 120 may utilize the I/O interfaces (1402/1502), processor(s) (1404/1504), memory (1406/1506), and/or storage (1408/1508) of the device(s) 110 and server(s) 120, respectively. Thus, the speech recognition component 250 may have its own I/O interface(s), processor(s), memory, and/or storage; the natural language component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110 and the server(s) 120, as described herein, are exemplary, and may be located as a stand-alone device or may be included, in whole or in part, as a component of a larger device or system.

Figure 16:
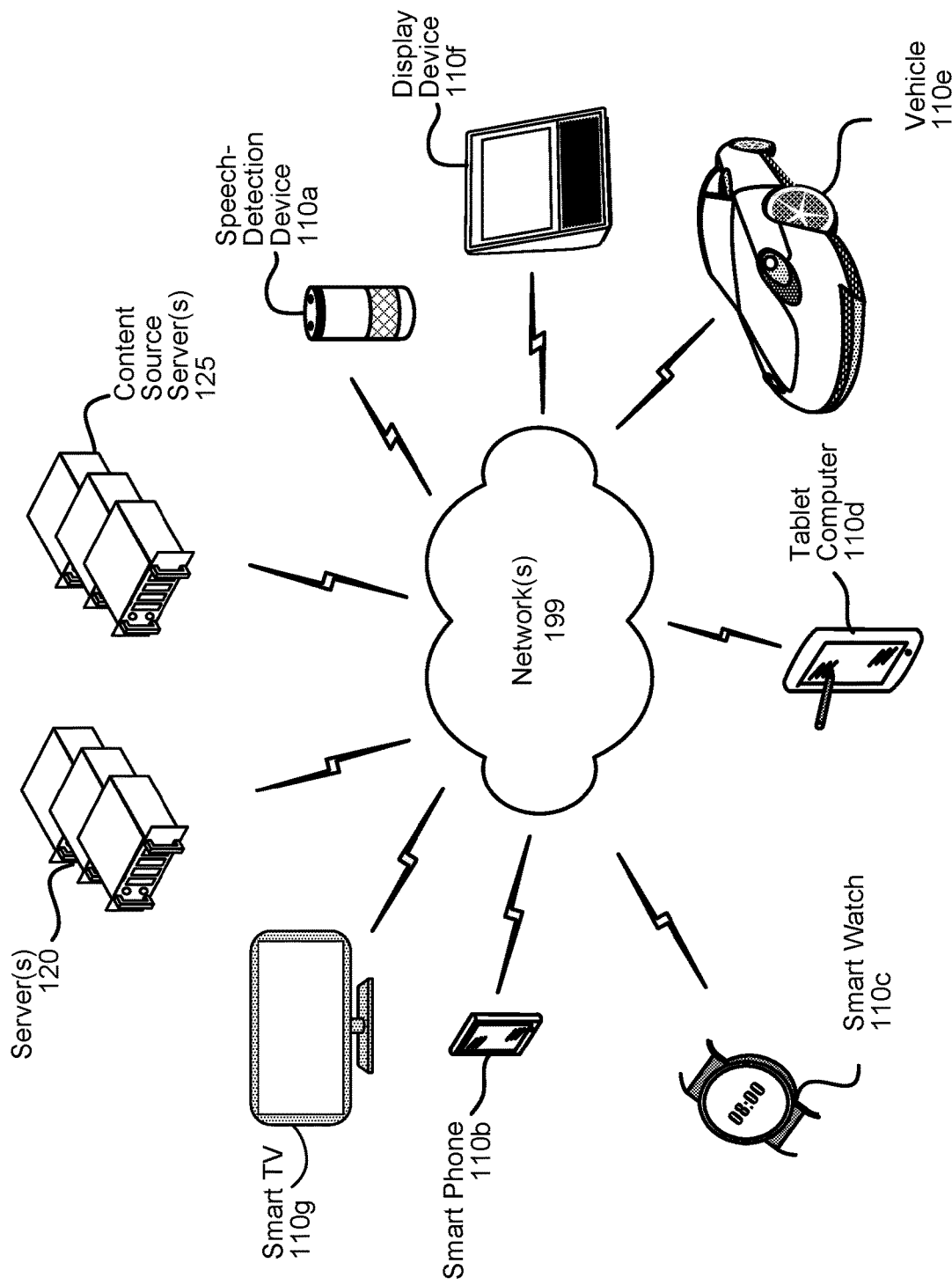
FIG. 16 illustrates an example of a computer network for use with the speech processing system.

As illustrated in FIG. 16, multiple devices (110a-110g, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, and/or a smart TV 110g may be connected to the network(s) 199 through a wireless service provider, over a WiFi or cellular network connection, or the like. Other devices are included as network-connected support devices, such as the server(s) 120, the content source server(s) 125, or others. The support devices may connect to the network(s) 199 through a wired connection or wireless connection. Networked devices may capture audio using one-or-more built-in or connected microphones or other audio capture devices, with processing performed by speech recognition components, natural language components, or other components of the same device or another device connected via the network(s) 199, such as the speech recognition component 250, the natural language component 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving, from a first device, first input audio data corresponding to a first utterance;
performing, by at least one second device, speech processing on the first input audio data to determine a first command;
determining, by the at least one second device, the first input audio data is sufficient to complete processing of the first command;
determining, by the at least one second device, first output data responsive to the first command;
sending, to the first device, the first output data;
determining, by the at least one second device, that the first command corresponds to a command type that is likely to be followed by a new command within a time threshold;
instructing, based at least in part on the command type of the first command, the first device to send further input audio data corresponding to further input audio without the first device determining a presence of a keyword in the further input audio data;
receiving, from the first device, second input audio data;
determining, by the at least one second device, the second input audio data corresponds to a second utterance intended for speech processing;
performing, by the at least one second device, speech processing on the second input audio data to determine a second command;
determining, by the at least one second device, second output data responsive to the second command; and
sending, to the first device, the second output data.

2. The computer-implemented method of claim 1, further comprising:
receiving, from the first device, third input audio data corresponding to a third utterance;
performing speech processing on the third input audio data to determine a third command requesting playback of media content including audio data;
determining third output data responsive to the third command;
sending, to the first device, the third output data; and
send an instruction to the first device to cease sending non-keyword triggered audio data.

3. The computer-implemented method of claim 1, further comprising:
determining a profile associated with the first device is associated with an indicator indicating permission for the first device to send audio data without first detecting a wakeword;
determining a second device associated with the first output data;
receiving the first output data from the second device; and
determining that no further output data is required from the second device to respond to the first command,
wherein the instructing the first device occurs after determining that no further output data is required from the second device.

4. The computer-implemented method of claim 1, wherein determining, by the at least one second device, the second input audio data corresponds to a second utterance intended for speech processing comprises:
processing the second input audio data to determine the second input audio data represents speech; and
after determining that the second input audio data represents speech, determining, using a trained model and at least a portion of automatic speech recognition (ASR) result data corresponding to the second input audio data, that the second input audio data corresponds to speech intended for further processing.

5. A system comprising:
at least one processor; and
at least one memory including instructions that, when executed by the at least one processor, cause the system to:
receive, from at least one first device, input audio data representing an utterance;
perform, by at least one second device, speech processing on the input audio data to determine command data;
determine, by the at least one second device, that the command data is sufficient input data to generate output data to respond to the utterance;
send, to the at least one first device, output data responsive to the command data;
determine, by the at least one second device, that the command data corresponds to a command type that is likely to be followed by a new command within a time threshold; and send, based at least in part on the command type, to the at least one first device, an instruction to send further input audio data corresponding to further input audio without the at least one first device detecting a wake command.

6. The system of claim 5, wherein the instructions, when executed by the at least one processor, further cause the system to:
receive, from the at least one first device, second input audio data corresponding to a second utterance;
perform speech processing on the second input audio data to determine a second command to cancel output of content; and
determine, based on the second command, to instruct the at least one first device to cease sending non-wake command triggered audio data.

7. The system of claim 5, wherein the instructions, when executed by the at least one processor, further cause the system to:
receive, from the at least one first device, second input audio data corresponding to a second utterance;
perform speech recognition processing on the second input audio data to generate input text data and a speech recognition score;
perform natural language processing on the input text data to determine a second command and a natural language score;
determine at least one of the speech recognition score or the natural language score falls below a threshold speech processing score; and
determine, based on at least one of the speech recognition score or the natural language score falling below a threshold speech processing score, to instruct the at least one first device to cease sending non-wake command triggered audio data.

8. The system of claim 5, wherein the instructions, when executed by the at least one processor, further cause the system to:
receive, from the at least one first device, second input audio data corresponding to a second utterance;
perform speech processing on the second input audio data to determine a second command requesting playback of media content including audio data;
determine second output data responsive to the second command;
send, to the at least one first device, the second output data; and
instructing the at least one first device to cease sending non-wake command triggered audio data.

9. The system of claim 5, wherein the instructions, when executed by the at least one processor, further cause the system to:
determine a profile includes a user preference indicating permission to send non-wake command triggered audio data; and
send, based on the user preference and the input audio data corresponding to the command data, the instruction to the at least one first device.

10. The system of claim 5, wherein the instructions, when executed by the at least one processor, further cause the system to:
determine at least one third device associated with the output data;
receive the output data from the at least one third device; and
determine that no further output data is required from the at least one third device to respond to the utterance, wherein sending the instruction to the at least one first device occurs after determining that no further output data is required from the at least one third device.

11. The system of claim 5, wherein the instructions, when executed by the at least one processor, further cause the system to:
determine a number of times the at least one first device has been instructed to send non-wake command triggered audio, the number of times corresponding to consecutive input commands;
determine the number of times fails to exceed a threshold number of times; and
further based on the number of times failing to exceed the threshold number of times, instruct the at least one first device to send the further input audio data.

12. A computer-implemented method comprising:
receiving, from at least one first device, input audio data representing an utterance;
performing, by at least one second device, speech processing on the input audio data to determine command data;
determining, by the at least one second device, that the command data is sufficient input data to generate output data to respond to the utterance;
sending, to the at least one first device, output data responsive to the output data;
determining, by the at least one second device, a profile includes a user preference indicating permission to send non-wake command triggered audio data; and
sending, based on the user preference and the input audio data corresponding to the command data, an instruction to the at least one first device to send further input audio data corresponding to further input audio without the at least one first device detecting a wake command.

13. The computer-implemented method of claim 12, further comprising
receiving, from the at least one first device, second input audio data corresponding to a second utterance;
performing speech processing on the second input audio data to determine a second command to cancel output of content; and
determining, based on the second command, to instruct the at least one first device to cease sending non-wake command triggered audio data.

14. The computer-implemented method of claim 12, further comprising:
receiving, from the at least one first device, second input audio data corresponding to a second utterance;
performing speech recognition processing on the second input audio data to generate input text data and a speech recognition score;
performing natural language processing on the input text data to determine a second command and a natural language score;
determining at least one of the speech recognition score or the natural language score falls below a threshold speech processing score; and
determining, based on at least one of the speech recognition score or the natural language score falling below a threshold speech processing score, to instruct the at least one first device to cease sending non-wake command triggered audio data.

15. The computer-implemented method of claim 12, further comprising:
receiving, from the at least one first device, second input audio data corresponding to a second utterance;

performing speech processing on the second input audio data to determine a second command requesting playback of media content including audio data;

determining second output data responsive to the second command;

sending, to the at least one first device, the second output data; and instructing the at least one first device to cease sending non-wake command triggered audio data.

16. The computer-implemented method of claim 12, further comprising:

determining that the command data corresponds to a command type that is likely to be followed by a new command within a time threshold.

17. The computer-implemented method of claim 12, further comprising:

determining at least one third device associated with the output data;

receiving the output data from the at least one third device; and determining that no further output data is required from the at least one third device to respond to the utterance, wherein sending the instruction to the at least one first device occurs after determining that no further output data is required from the at least one third device.

18. The computer-implemented method of claim 12, further comprising:

determining a number of times the at least one first device has been instructed to send non-wake command triggered audio, the number of times corresponding to consecutive input commands;

determining the number of times fails to exceed a threshold number of times; and further based on the number of times failing to exceed the threshold number of times, instructing the at least one first device to send the further input audio data.

19. A system comprising:

at least one processor; and memory including instructions that, when executed by the at least one processor, cause the system to:

receive, from at least one first device, input audio data representing an utterance;

perform, by at least one second device, speech processing on the input audio data to determine command data;

determine, by the at least one second device, that the command data is sufficient input data to generate output data to respond to the utterance;

send, to the at least one first device, output data responsive to the command data;

send, based at least in part on the command data, to the at least one first device, an instruction to send further input audio data corresponding to further input audio without the at least one first device detecting a wake command;

receive, from the at least one first device, second input audio data corresponding to a second utterance;

perform, by the at least one second device, speech recognition processing on the second input audio data to generate a speech processing score;

determine, by the at least one second device, the speech processing score falls below a threshold speech processing score; and determine, based on the speech processing score falling below a threshold speech processing score, to instruct the at least one first device to cease sending non-wake command triggered audio data.

20. The system of claim 19, wherein the memory further comprises instructions that, when executed by the at least one processor, further cause the system to:

determine a profile indicates a user permission to send non-wake command triggered audio data following the utterance; and send, based on the user permission and the input audio data corresponding to the command data, the instruction to the at least one first device.

* * * * *